US012494266B1

United States Patent
Donnella et al.

(10) Patent No.: US 12,494,266 B1
(45) Date of Patent: Dec. 9, 2025

(54) UTILIZING A CLINICAL-PHENOMICS CAUSAL DISCOVERY FRAMEWORK TO GENERATE CAUSAL DISCOVERY PREDICTIONS

(71) Applicant: Recursion Pharmaceuticals, Inc., Salt Lake City, UT (US)

(72) Inventors: Hayley Jeton Donnella, Austin, TX (US); Seyed Ali Madani Tonekaboni, Toronto (CA); William Paul Bone, Salt Lake City, UT (US)

(73) Assignee: Recursion Pharmaceuticals, Inc., Salt Lake City, UT (US)

( * ) Notice: Subject to any disclaimer, the term of this patent is extended or adjusted under 35 U.S.C. 154(b) by 0 days.

(21) Appl. No.: 18/738,927

(22) Filed: Jun. 10, 2024

(51) Int. Cl.
*G16B 25/00* (2019.01)
*G16B 20/00* (2019.01)
*G16B 20/20* (2019.01)
*G16B 20/50* (2019.01)
*G16B 40/20* (2019.01)

(52) U.S. Cl.
CPC ............. *G16B 20/00* (2019.02); *G16B 40/20* (2019.02)

(58) Field of Classification Search
CPC ............................... G16B 20/00; G16B 40/20
See application file for complete search history.

(56) References Cited

U.S. PATENT DOCUMENTS

| 2007/0059685 | A1* | 3/2007 | Kohne | G16B 25/10 |
| | | | | 435/5 |
| 2019/0352388 | A1* | 11/2019 | Cesaroni | C12Q 1/6883 |
| 2020/0165680 | A1* | 5/2020 | Bahado-Singh | G16B 20/20 |
| 2021/0079366 | A1* | 3/2021 | Zhang | C12N 15/86 |
| 2023/0395193 | A1* | 12/2023 | Krogan | G16B 20/50 |

* cited by examiner

*Primary Examiner* — Brandon S Cole

(74) *Attorney, Agent, or Firm* — Keller Preece PLLC

(57) ABSTRACT

The present disclosure relates to systems, non-transitory computer-readable media, and methods that analyze gene perturbation machine learning embeddings and clinical observation data sets utilizing machine learning, explainability models, and causal discovery models to generate causal predictions between one or more genes and clinical outcomes. Indeed, in one or more implementations, the disclosed systems identify gene perturbation embeddings generated from cells exposed to perturbations. For instance, the disclosed systems select a cluster of genes from a plurality of genes by applying a clustering model to the gene perturbation embeddings. In some instances, the disclosed systems select gene targets from the cluster of genes by using a machine learning classification model trained on a plurality of features of the clinical observation data set. Moreover, in some instances, the disclosed systems generate the causal prediction from the gene targets and the clinical observation data set utilizing a causal discovery model.

20 Claims, 13 Drawing Sheets

UTILIZING A CLINICAL-PHENOMICS CAUSAL DISCOVERY FRAMEWORK TO GENERATE CAUSAL DISCOVERY PREDICTIONS

BACKGROUND

Recent years have seen significant developments in hardware and software platforms for utilizing software tools to analyze clinically observed data to determine relationships between certain health abnormalities and clinically observed factors. For example, over multiple days, conventional systems can run computational models to parse through clinical data and map certain clinical features to specific diseases. Despite recent advancements, conventional systems continue to experience a variety of technical problems, including accuracy, efficiency, and operational flexibility of implementing computing devices in mapping relationships between clinical data and specific diseases.

SUMMARY

Embodiments of the present disclosure provide benefits and/or solve one or more of the foregoing or other problems in the art with systems, non-transitory computer-readable media, and methods for utilizing machine learning models and a causal discovery framework to generate causal predictions between genes and a clinical outcomes based on phenomic and clinical data repositories. For example, in one or more implementations, the disclosed systems utilize phenomic image embeddings to isolate related genes, utilize a classification model trained on clinical data corresponding to the related genes to identify gene targets, and then utilize a causal discovery model to generate predicted clinical outcomes for the gene targets. To illustrate, the disclosed systems generate gene perturbation embeddings from phenomic images of cells exposed to perturbations. Moreover, in one or more implementations the disclosed systems apply a clustering model to the gene perturbation embeddings to select a cluster of genes. Moreover, the disclosed systems utilize a machine learning classification model trained on a clinical observation data set (together with an explainability model) to generate gene targets from the selected cluster of genes. Further, in some embodiments, the disclosed systems utilize a causal discovery model to generate a causal prediction between a gene and a clinical outcome based on the gene targets and the clinical observation data set.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Embodiments of the present disclosure provide benefits and/or solve one or more of the foregoing or other problems in the art with systems, non-transitory computer-readable media, and methods of a model framework for predicting causal relationships utilizing clinically observed data and phenomics data. In particular, in one or more implementations a causal discovery system 100 utilizes a phenomap (e.g., a representation of phenotypic traits in phenomic image embeddings generated utilizing a machine learning model) to filter genes corresponding to the phenomap in a biologically intelligent way (e.g., grouping together genes based on functional similarities and selecting certain clusters to further analyze). In doing so, the causal discovery system 100 can reduce the dimensionality of data for causal discovery models to process and to further generate improved causal predictions for clinical outcomes in an efficient manner. For instance, in some implementations, the causal discovery system 100 utilizes a framework that includes three steps (1) data processing, to identify related genes from the phenomap, (2) feature selection/filtering of features corresponding to a specific cluster of genes utilizing a machine learning classification model and an explainability model, and (3) application of a causal discovery model to selected/filtered genes to generate causal predictions between genes and clinical outcomes.

Figure 1:
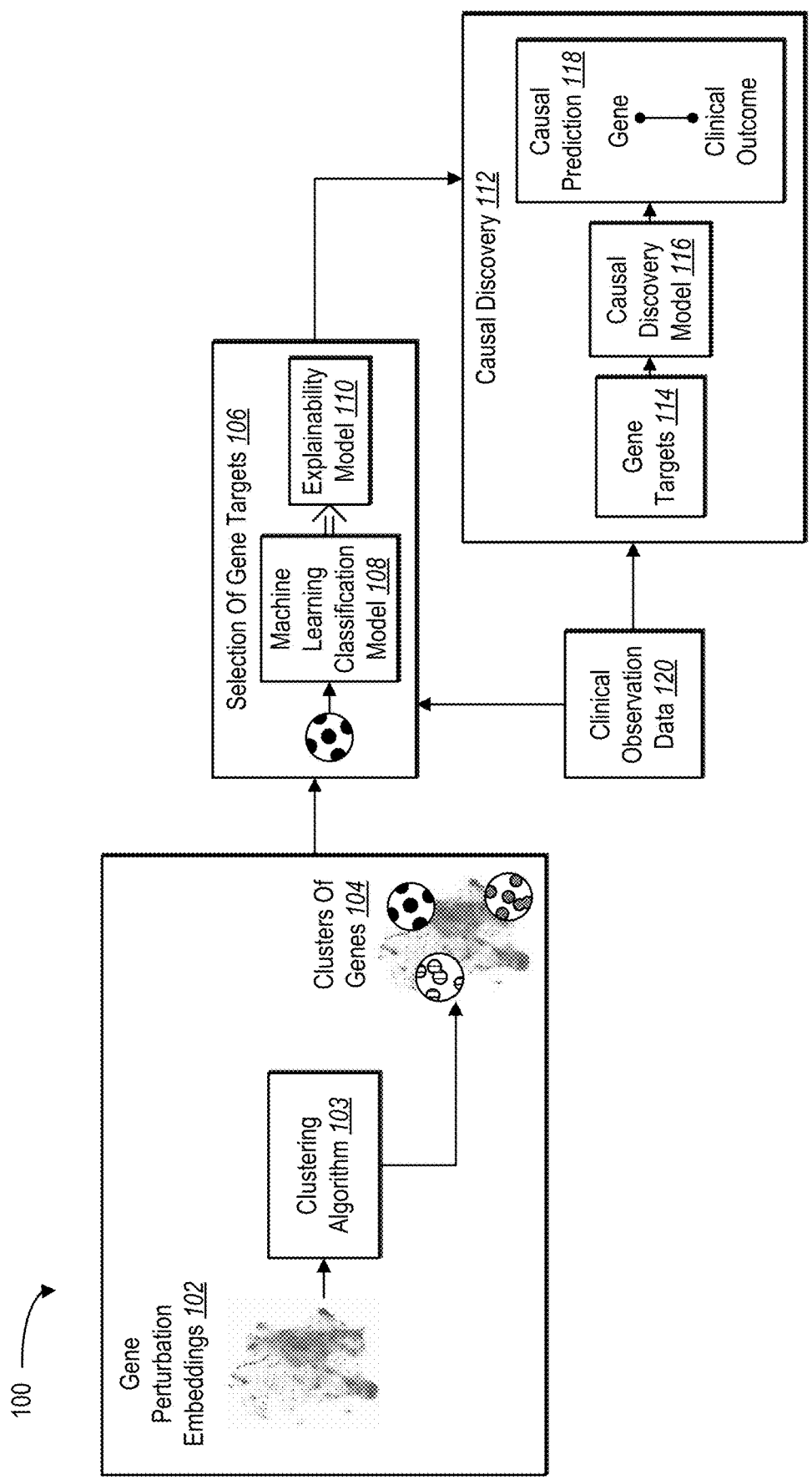
FIG. 1 illustrates an overview diagram of a causal discovery system generating a causal prediction based on clinical observation data and phenomic data in accordance with one or more embodiments.

With regard to data processing, the causal discovery system 100 utilizes gene perturbation embeddings generated from phenomic images to identify related gene clusters. Specifically, the causal discovery system 100 applies a clustering model to phenomic image embeddings of various gene knockout assays to identify a plurality of gene clusters to analyze individually. For instance, as shown in FIG. 1, the causal discovery system 100 generates gene perturbation embeddings 102. In one or more implementations, the causal discovery system 100 generates and/or accesses perturbation embeddings across all (or a significant portion) of a phenome.

As used herein, the term "gene perturbation embedding" (or perturbation embeddings, or phenomic image embeddings) refers to a numerical representation resulting from perturbations to a cell. For example, a gene perturbation embedding includes a vector representation of a perturbation image generated by a machine learning model (e.g., a convolutional neural network, autoencoder neural network, or other machine learning embedding model). A gene perturbation embedding can also include a numerical representation of other biological signals (other than perturbation images). For example, the gene perturbation embedding can include a transcriptomic embedding/profile reflecting protein expression resulting from perturbation of a cell. Thus, a gene perturbation embedding includes a feature vector generated by application of various neural network layers (at different resolutions/dimensionality) or another numerical representation of a biological signal resulting from applying a perturbation to a cell.

Furthermore, as shown, the causal discovery system 100 generates clusters of genes 104 from the gene perturbation embeddings 102. As used herein, the term "cluster of genes" refers to a group of two or more genes (e.g., based on function, interaction, or association). Specifically, the clusters of genes 104 can be based on functional similarities, where genes share similar biological functions such as a biological pathway. Further, the clusters of genes 104 can be based on co-expression, where genes tend to have similar expression patterns (e.g., which can indicate coregulated or functionally related genes). Moreover, the clusters of genes 104 can be based on co-evolutionary similarities (e.g., genes that evolve together across species), phenotypes (e.g., genes associated with similar phenotypes), structural similarity (e.g., genes with similar protein structures), temporal patterns (e.g., genes that are activated or suppressed at similar points during development or in response to certain stimuli), tissue expression (e.g., genes that are specifically expressed in the same cell type), and/or regulation (e.g., genes that are regulated by the same factors).

As illustrated, the causal discovery system 100 can generate clusters of genes by applying a clustering algorithm 103 to the gene perturbation embeddings 102. Indeed, as discussed above, the causal discovery system 100 generates the gene perturbation embeddings 102 from phenomic images reflecting gene perturbations applied to one or more cells. Thus, the gene perturbation embeddings 102 reflect phenomic features of gene perturbations within a shared feature space. By applying the clustering algorithm 103 to the gene perturbation embeddings 102 within this shared feature space, the causal discovery system 100 can generate the clusters of genes 104, where each of the clusters reflect related groups of genes.

As shown, the causal discovery system 100 performs an act 106 of selecting gene targets. For example, the causal discovery system 100 utilizes a machine learning classification model 108 and an explainability model 110 to isolate the gene targets. For example, in one or more implementations, the causal discovery system 100 utilizes clinical observation data 120 corresponding to a particular cluster of genes to train a classification model to generate clinical outcome predictions. The causal discovery system 100 then utilizes an explainability model to determine the genes (and/or other features) most significant in generating clinical outcome predictions for the trained classification model. The causal discovery system 100 can rank genes based on the marginal contribution of the genes in predictions for the trained classification model to select gene targets for further exploration in a causal discovery analysis. Additional detail regarding the act 106 and selecting gene targets is explained in more detail below (e.g., in relation to FIGS. 3-4).

As used herein, the term "clinical observation data set" refers to a data set that contains features related to clinical patients. For example, a clinical observation data set can include features collected from clinical patients related to treatment of one or more diseases (e.g., molecular data and additional clinical data related to treatment of a patient and extrapolations of clinically observed data). In other words, features from the clinical observation data set can include actual clinical data and also data inferred from clinical data. Thus, for example, a clinical observation data set can include a variety of clinical features, including patient demographic features (e.g., age, sex, etc.), treatment features (e.g., therapeutics, drugs, molecules, or other treatments), genetics (e.g., extracted DNA), proteins (e.g., RNA or other protein expression data from patient cells), embeddings created/generated from one or more clinical datasets, clinical data representations (e.g., various data representations of collected clinical observations), or other features related clinical patients and a corresponding disease. A clinical observation data can include synthetic data (e.g., data generated from other clinical observation data). To illustrate, the causal discovery system 100 can receive a subset of DNA regarding a clinical patient, utilize a machine learning model to predict the entire genome, and utilize the entire genome as a feature from the clinical observation data set. Thus, clinical features in a clinical observation data set can include expression levels, gender, race, ethnicity, age, smoking status, lifestyle factors, comorbidities, treatment data, and socioeconomic data. A clinical observation data set can also include observed clinical outcomes (e.g., disease progression, treatment response, survival rates, etc.). As just mentioned, in one or more implementations, the causal discovery system 100 utilizes observed clinical outcomes as ground truth measures for training one or more machine learning models (e.g., to identify the gene targets 114).

Upon identifying the gene targets 114 (e.g., the most significant genes that contribute to clinical outcome predictions), the causal discovery system 100 then utilizes causal discovery 112 to analyze the clinical data and the gene targets 114 and generate a causal prediction 118. The causal discovery system 100 analyzes the clinical data features utilizing the causal discovery model 116 to generate the causal prediction 118 for the gene targets 114 selected from genes clusters identified utilizing the phenomap image embedding analysis. In this manner, the causal discovery system 100 utilizes both phenomic image embeddings and clinical observation data to efficiently and accurately generate causal predictions. Indeed, as shown, the causal discovery system 100 generates the causal prediction 118 between a gene and a clinical outcome.

In one or more embodiments, the causal discovery system 100 can surface the causal prediction 118 to client devices and/or utilize the causal predictions in downstream tasks. For example, the causal discovery system 100 can utilize causal predictions to benchmark genes for additional analysis. For instance, the causal discovery system 100 can utilize the causal prediction 118 as described below in relation to FIGS. 7-10.

As mentioned above, conventional systems suffer from a number of technical deficiencies that can be addressed by the causal discovery system 100. For example, conventional systems suffer from inaccuracy in generating or identifying relationships between genes and clinical outcomes. Specifically, conventional systems typically depend on the availability of clinically observed data for a specific disease. For instance, conventional systems typically process a large volume of clinically observed data to attempt to hone in on specific relationships between genes and clinical outcomes. In conventional systems, however, it is difficult to identify relationships between genes and clinical outcomes because of the high dimensionality of clinically observed data. Moreover, available clinical data typically has significant noise (e.g., random variability or errors) and requires a large pool of patients to create an accurate clinical database. For example, conventional systems have failed to accurately generate relationship predictions between genes and clinical outcomes.

Furthermore, conventional systems suffer from inefficiencies in generating predictions of relationships between genes and clinical outcomes. Indeed, as mentioned, conventional systems typically require a large volume of clinically observed data. To parse through such data requires an excessive number of computational resources and time. For instance, conventional systems can take days or weeks to attempt to map certain clinical features from observed clinical data to certain clinical outcomes. Even upon mapping certain clinical features to certain clinical outcomes, the results of conventional systems are often inaccurate, as discussed above.

In addition to these accuracy and efficiency concerns, conventional systems also suffer from operational inflexibility. As mentioned above, conventional systems rigidly rely on observed clinical data to identify certain relationships between genes and clinical outcomes. As discussed, this rigid approach undermines the ability of conventional systems to utilize clinical observation data to discover meaningful causal relationships.

The causal discovery system 100 provides a variety of technical benefits and address technical problems of conventional systems. For example, the causal discovery system 100 can improve accuracy of implementing computing devices by establishing a causal discovery framework that draws from both phenomic data and clinically observed data to generate causal predictions between a gene and a clinical outcome. In contrast to conventional systems, the causal discovery system 100 utilizes phenomic image embeddings, clinical observation data set, trained classification models, and explainability models to isolate gene targets, and then utilizes a causal discovery model to generate a causal prediction between a gene and a clinical outcome based on the gene targets and the clinical observation data set. In other words, the causal discovery system 100 filters the data in a biologically intelligent way and utilizes a causal discovery model that results in more accurate causal predictions. Thus, because the causal discovery system 100 draws from both the phenomics data and the clinically observed data utilizing a unique data engineering, machine learning, and causal discovery framework, the causal discovery system 100 generate causal predictions more accurately between gene and clinical outcomes.

In addition to improving upon accuracy, the causal discovery system 100 can further improve upon efficiency of conventional systems. For example, the causal discovery system 100 can improve efficiency by generating clusters of genes from phenomic data, selecting a cluster of genes, and generating gene targets from the cluster of genes. From the gene targets, the causal discovery system 100 can further generate a causal prediction between a gene and a clinical outcome. In contrast to conventional systems which consume excessive time and resources to parse through clinically observed data, the causal discovery system 100 efficiently narrows down a large data set to gene targets by finding correspondences between the clinical observation data set and the phenomics data. In other words, the causal discovery system 100 can select a cluster of genes most relevant to a clinical outcome and can use the cluster of genes to efficiently identify the corresponding features from the clinical observation data set to find causal relationships between a gene and the clinical outcome. This approach can significantly reduce time and computer resources in generating causal predictions. Accordingly, the causal discovery system 100 efficiently improves upon conventional systems in generating a causal prediction between a gene and a clinical outcome by implementing the causal discovery framework.

Related to the accuracy and efficiency improvements, the causal discovery system 100 further improves upon operational flexibility of conventional systems. In contrast to conventional systems which rigidly rely on observed clinical data, the causal discovery system 100 flexibly draws from both the clinical observation data set and the phenomics data to identify gene targets in an efficient and accurate manner. This more flexible approach allows implementing computing devices to also perform causal predictions tasks previously unavailable to conventional systems.

Figure 2:
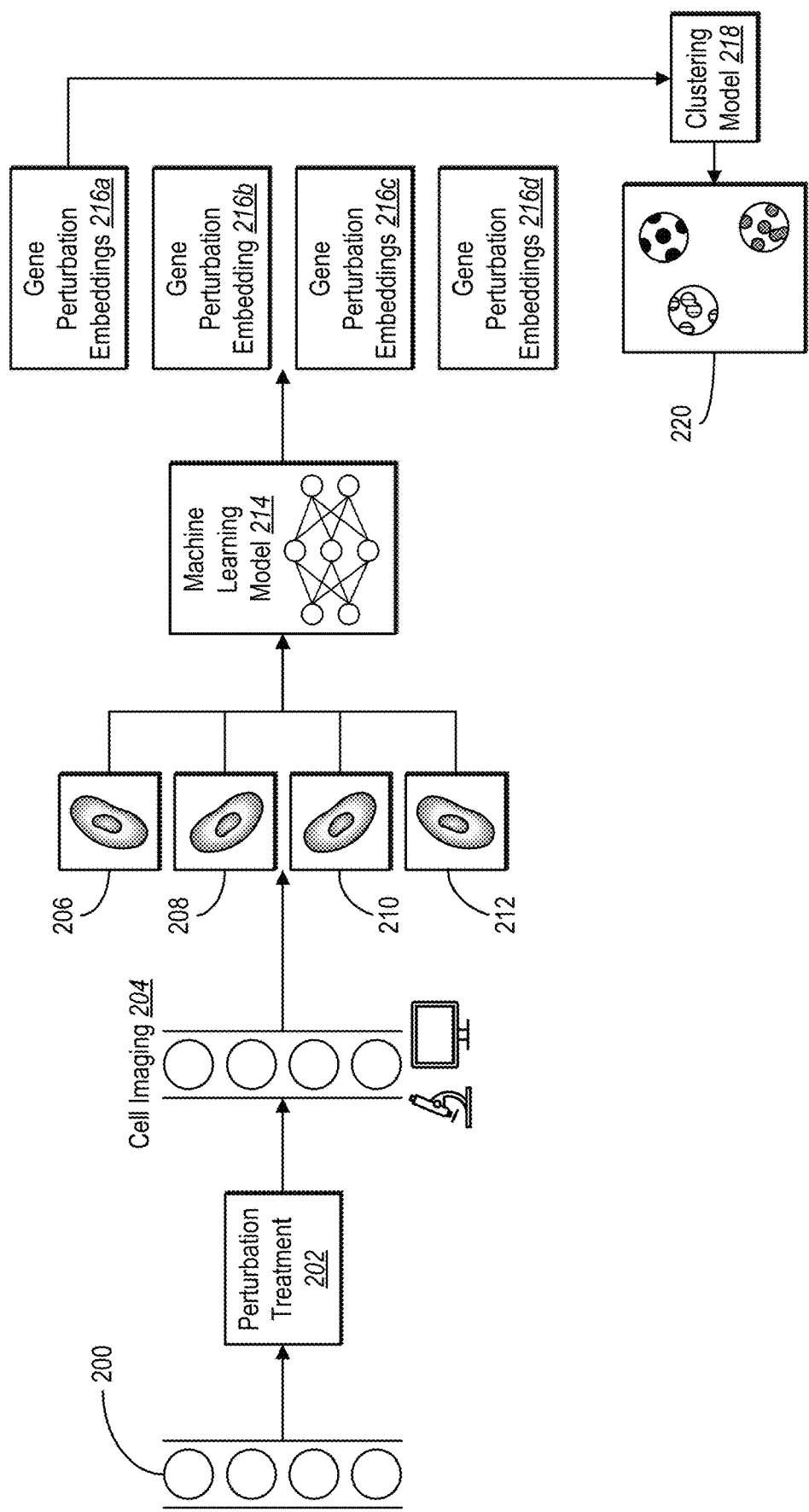
FIG. 2 illustrates an example diagram of the causal discovery system generating gene perturbation embeddings in accordance with one or more embodiments.

As mentioned above, the causal discovery system 100 generates gene perturbation embeddings by exposing cells to perturbations, imaging the exposed cells, and utilizing a machine learning model to generate the gene perturbation embeddings. As shown in FIG. 2, the causal discovery system 100 further utilizes a clustering model on the gene perturbation embeddings to generate a plurality of clusters in accordance with one or more embodiments.

As shown, the causal discovery system 100 applies a perturbation treatment 202 to cells 200. As used herein, the term "cell" refers to a structural, functional, and biological unit of living organisms. Specifically, a cell can vary in size, shape, and function depending on the organism and the role of the cell. For example, a cell can include a plasma membrane to separate the internal cell environment from the external surroundings and the cell can further contain genetic material.

As used herein, the term "perturbation" (e.g., cell perturbation) refers to an alteration or disruption to a cell or the cell's environment (to elicit potential phenotypic changes to the cell). In particular, the term perturbation can include a gene perturbation (i.e., a gene-knockout perturbation) or a compound perturbation (e.g., a molecule perturbation or a soluble factor perturbation). Perturbations can also include protein, antibody, or virus perturbations. These perturbations are accomplished by performing a perturbation experiment. A perturbation experiment refers to a process for a perturbation to a cell. A perturbation experiment also includes a process for developing/growing the perturbed cell into a resulting phenotype. To illustrate, the causal discovery system 100 can perturb a gene in a cell and generate gene perturbation embeddings from the perturbation to the gene.

As shown in FIG. 2, the causal discovery system 100 can perform cell imaging 204 on the cells 200 with the perturbation treatment 202 and generate phenomic images of cells 206-212. As used herein, the term phenomic images of cells, refers to a digital image portraying a cell (e.g., a cell after applying a perturbation). For example, phenomic images of cells includes a digital image of a stem cell after application of a perturbation and further development of the cell. Thus, the phenomic images of cells comprises pixels that portray a modified cell phenotype resulting from a particular cell perturbation.

As further shown, the causal discovery system 100 can embed the phenomic images of cells into a low dimensional feature space via a machine learning model 214 (e.g., a convolutional neural network) to generate gene perturbation embeddings 216a-216d. Thus, gene perturbation embeddings 216a-216d includes a feature vector generated by application of various convolutional neural network layers (at different resolutions/dimensionality). For instance, the causal discovery system 100 utilizes an image encoder to process the phenomic images of cells and generate the gene perturbation embeddings 216a-216d which include a vector representation of a perturbation image generated by a machine learning model. To illustrate, the causal discovery system 100 utilizes the machine learning model 214 as described in U.S. patent application Ser. No. 18/545,399, titled UTILIZING MASKED AUTOENCODER GENERATIVE MODELS TO EXTRACT MICROSCOPY REPRESENTATION AUTOCODER EMBEDDINGS, or UTILIZING MACHINE LEARNING MODELS TO SYNTHESIZE PERTURBATION DATA TO GENERATE PERTURBATION HEATMAP GRAPHICAL USER INTERFACES, U.S. patent application Ser. No. 18/526,707, which are incorporated by reference herein in their entirety.

As shown, the causal discovery system 100 can then process the gene perturbation embeddings 216a-216d utilizing a clustering model 218. As used herein, the term "clustering model" refers to a model that groups together related sets of genes (e.g., functionally related sets of genes from a phenomic map). Specifically, the causal discovery system 100 can utilize a clustering model that groups together genes by using a feature space or by using a similarity metric. For example, the causal discovery system 100 can utilize the clustering model 218 to generate multiple clusters of genes from the plurality of genes in the phenomic map by representing the genes as vectors in a multi-dimensional feature space. For instance, the causal discovery system 100 utilizes the clustering model 218 to group together genes based on distances between vectors (e.g., the causal discovery system 100 utilizes the clustering model 218 to reduce the dimensionality of the data).

Moreover, in some embodiments, the causal discovery system 100 utilizes the clustering model 218 to generate multiple clusters of genes using a similarity matrix. Specifically, the causal discovery system 100 utilizes a matrix where each entry of the matrix indicates a similarity between pairs of genes. Based on the similarity between genes, the causal discovery system 100 can group together genes into clusters of genes 220.

The causal discovery system 100 can utilize a variety of clustering algorithms to generate gene clusters. For example, the causal discovery system 100 can utilize k-means clustering, hierarchical clustering, DBSCAN, mean shift clustering, or spectral clustering to analyze gene perturbation embeddings and generate gene clusters.

As mentioned, upon identifying a cluster of genes, the causal discovery system 100 then utilizes a machine learning classification model to select/filter particular genes/features to analyze. Specifically, the causal discovery system 100 trains classification models on clinical data corresponding to each gene cluster identified from a phenomic map. In particular, the causal discovery system 100 trains a classification model on clinical features and a particular gene cluster to generate clinical outcome predictions such as survivability or response (e.g., utilizing the observed outcomes from the clinical data as ground truth).

Although FIG. 2 (and other portions of the description herein) often utilize phenomic images as the source of gene perturbation embeddings, the causal discovery system 100 can generate gene perturbation embeddings from other biological data/signals. For example, in some embodiments, the causal discovery system 100 can utilize transcriptomic data (e.g., protein expression data, such as RNA data) to generate a gene perturbation embedding.

For example, the causal discovery system 100 can apply a perturbation treatment to a cell and monitor/identify protein expression information from the perturbed cell. Specifically, the causal discovery system 100 can generate a transcriptomic profile of the perturbed cell by extracting protein expression data. As used herein, the term "protein expression data" refers to information obtained from the measurement of protein levels within a biological sample (e.g., a cell or tissue). For example, protein expression data can include a count/number (or other measure) of different RNA or mRNA within one or more cells after being exposed to a particular perturbation. Thus, the causal discovery system 100 can utilize a sequencing machine to identify and count particular transcription proteins after application of a perturbation. Moreover, the causal discovery system 100 can generate a transcription profile (e.g., a number of each type of RNA/mRNA). In some implementations, the causal discovery system 100 utilizes the transcription profile as the gene perturbation embeddings. In one or more embodiments, the causal discovery system 100 further process the transcription profile (e.g., utilizing a machine learning layer) to generate a vector representation as the gene perturbation embedding.

Figure 3:
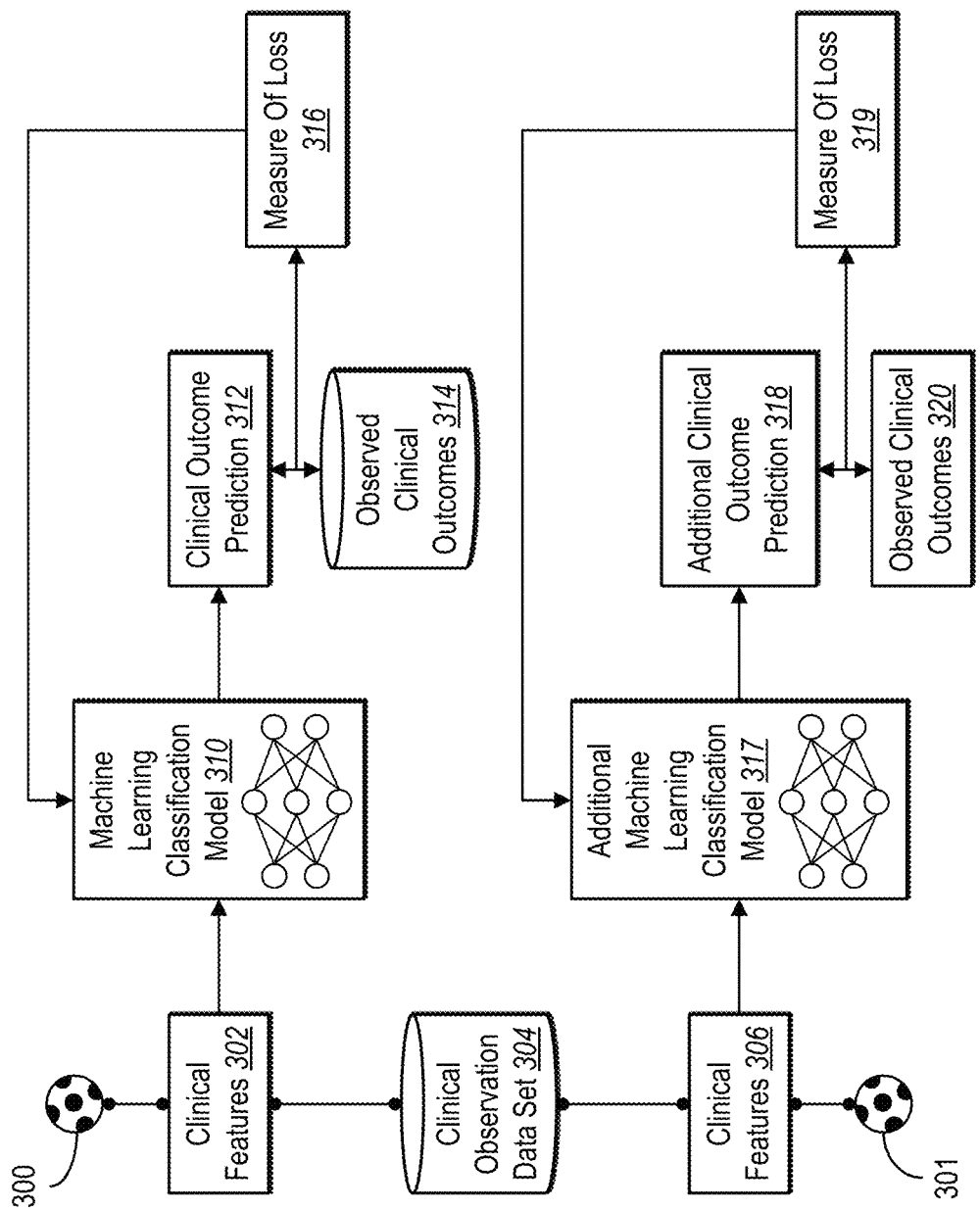
FIG. 3 illustrates an example diagram of the causal discovery system training machine learning classification models in accordance with one or more embodiments.

As shown in FIG. 3, the causal discovery system 100 separately trains machine learning classification models for different clusters of genes based on corresponding clinical features (e.g., actual recorded clinical data and/or data representations extrapolated/inferred from the clinical observation data set) from the clinical observation data set and observed clinical outcomes from the clinical observation data set in accordance with one or more embodiments.

For example, FIG. 3 shows the causal discovery system 100 identifying clinical features 302 (e.g., DNA and/or RNA for the cluster of genes, sex, gender, race, ethnicity, age, smoking status, lifestyle factors, comorbidities, treatment data, socioeconomic data, data embeddings, and data representations inferred from one or more additional clinical data sets/records) corresponding to a cluster of genes 300 from a clinical observation data set 304. Further, FIG. 3 shows the causal discovery system 100 processing the clinical features 302 with a machine learning classification model 310. For instance, the causal discovery system 100 provides to the machine learning classification model 310 clinical features 302 that correspond to the cluster of genes 300. Specifically, rather than generally providing DNA or RNA sequence data (e.g., all DNA or RNA data for an organism or subject), the causal discovery system 100 provides particular DNA or RNA sequence data that corresponds to a selected cluster of genes.

As used herein, the term "machine learning classification model" refers to a machine learning model trained to generate classification predictions (e.g., clinical outcome predictions for clinical features corresponding to a cluster of genes). Specifically, the causal discovery system 100 trains a machine learning classification model by using the model to generate clinical outcome predictions for the cluster of genes from clinical features of the clinical observation data set 304. The causal discovery system 100 can utilize a variety of machine learning classification models, including decision trees, support vector machines, or neural networks (e.g., deep neural networks/convolutional neural networks). In one or more embodiments, the causal discovery system 100 utilizes a light gradient boosting machine (e.g., LightGBM) as the machine learning classification model 310. For instance, the causal discovery system 100 trains the LightGBM to build an ensemble of decision tress where each new tree is trained to correct the errors from previous tress. Moreover, at inference time, the causal discovery system 100 can utilize the LightGBM to process the cluster of genes and the causal discovery system 100 traverses down a tree to a leaf node based on values defined at each node. In doing so, the causal discovery system 100 can generate a final probability (e.g., which can be compared to a threshold or a binary decision) to generate a clinical outcome prediction for a gene of the cluster of genes.

To illustrate, the causal discovery system 100 identifies the cluster of genes 300 and further identifies DNA and RNA sequence data corresponding to each gene of the cluster of genes 300. For instance, the DNA and RNA sequence data corresponding to each gene of the cluster of genes 300 includes a nucleotide sequence, gene annotation, gene name/identifier, organism information, genomic location, sequence features (repetitive elements, mutations, variations, etc.), transcript sequence, transcript annotation (exon and intron boundaries, start and stop codons, etc.), transcript name/identifier, and sequence features (abundance or expression levels of a transcript in different cell types). From the DNA and RNA sequence data for each gene of the cluster of genes 300 and additional clinical features (e.g., sex, gender, race, ethnicity, age, smoking status, etc.), the causal discovery system can generate clinical outcome prediction 312.

As used herein, the term "clinical outcome predictions" refers to a prediction regarding an outcome. As described in greater detail below, a clinical outcome prediction can include a variety of predicted results or metrics corresponding to a treatment or disease. For example, a clinical outcome prediction can include a predicted measure of disease progression, treatment response, survival rate, etc.

For example, as shown, the causal discovery system 100 compares the clinical outcome predictions 312 with observed clinical outcomes 314 (e.g., ground truth data from the clinical observation data set 304) to determine a measure of loss 316. From the measure of loss 316, the causal discovery system 100 can modify parameters of the machine learning classification model 310. As used herein, the term "a measure of loss" refers to a loss function which the causal discovery system 100 attempts to minimize. For instance, the causal discovery system 100 can utilize gradient descent to minimize the loss function.

As alluded to above, in some implementations, the causal discovery system 100 utilizes a specifically trained machine learning classification model for each cluster of genes. Specifically, the causal discovery system 100 can train an additional machine learning classification model 317 utilizing the clinical features 306 corresponding to an additional cluster of genes 301 (different than the cluster of genes 300). For example, the causal discovery system 100 can train the additional machine learning classification model 317 by generating the additional clinical outcome prediction 318 and comparing it to an observed clinical outcomes 320 (e.g., a ground truth) from the clinical observation data set 304. From the comparison, the causal discovery system 100 can determine a measure of loss 319 and modify parameters of the additional machine learning classification model 317 based on the measure of loss 319.

Thus, the causal discovery system 100 trains the machine learning classification model 310 to generate clinical outcome predictions based on the clinical features 302 corresponding to the cluster of genes 300. Moreover, the causal discovery system 100 trains the machine learning classification model 317 to generate clinical outcome predictions based on the clinical features 306 corresponding to the cluster of genes 301. The causal discovery system 100 can train additional (e.g., dozens or hundreds) of classification models corresponding to different gene clusters.

Figure 4:
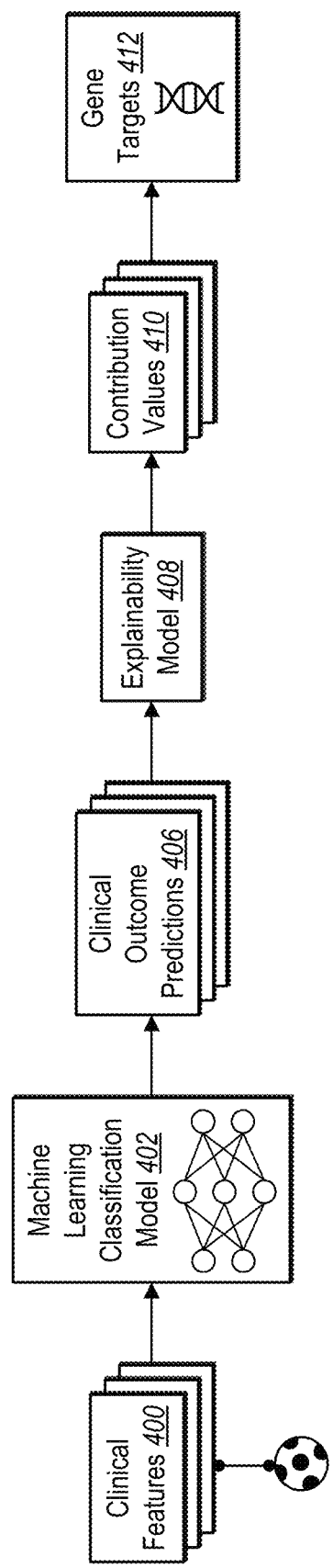
FIG. 4 illustrates an example diagram of the causal discovery system utilizing a machine learning classification model and an explainability model to generate gene targets in accordance with one or more embodiments.

As mentioned above, the causal discovery system 100 can generate gene targets by using a machine learning classification model and an explainability model. As shown, FIG. 4 illustrates the causal discovery system 100 processing clinical features corresponding to a cluster of genes and using an explainability model to find the most significant features in accordance with one or more embodiments. For example, FIG. 4 shows the causal discovery system 100 utilizing a machine learning classification model 402 at inference time to process clinical features 400 corresponding to a cluster of genes. At inference time, the causal discovery system 100 can utilize the trained machine learning classification model to generate clinical outcome predictions 406 from the clinical features 400 corresponding to the cluster of genes (e.g., for perturbations to a cluster of genes, corresponding clinical features can include specific DNA or RNA data sequences that correspond to the cluster of genes, demographic information, clinical history, lifestyle factors, pathological features, biomarker levels, gene expression profiles, treatment history, etc.). To reiterate, the machine learning classification model 402 is trained specifically for classifying the cluster of genes. Accordingly, as described above in FIG. 3, the causal discovery system 100 utilizes the machine learning classification model 402 to process clinical features that correspond to a cluster of genes, which includes specific DNA and/or RNA data sequences for each gene of the cluster of genes and additional clinical features corresponding to the cluster of genes (e.g., sex, age, race, etc.) to generate the clinical outcome predictions 406.

As shown, the causal discovery system 100 can further utilize the clinical outcome predictions 406 to determine which clinical features most contribute to a predicted clinical outcome. For instance, the causal discovery system 100 utilizes an explainability model 408 to process the clinical outcome predictions 406 and generate contribution values 410.

As used herein, the term "explainability model" refers to a computer-implemented model to understand contribution of various features in predictions generated by a machine learning model. For example, the causal discovery system 100 utilizes the explainability model 408 to determine a measure of contribution (e.g., marginal contribution) for individual genes within a cluster of genes that relative to clinical outcome predictions of the machine learning classification model 402. Specifically, the causal discovery system 100 utilizes the explainability model 408 to generate the contribution values 410 for genes of the cluster of genes from a plurality of clinical outcome predictions of the machine learning classification model 402. As used herein, the term "contribution values" refers to individual impact or importance of a feature to the machine learning classification model 402 on a clinical outcome prediction (e.g., a contribution value per gene to the clinical outcome prediction).

For example, the causal discovery system 100 can use the explainability model 408 to assign contributions to each input feature of the machine learning classification model based on its impact on the output (e.g., the clinical outcome prediction) by considering interactions between features. Moreover, the causal discovery system 100 generates or identifies the gene targets 412 from the cluster of genes based on the contribution values 410.

As used herein, the term "gene targets" refers to one or more genes selected from the cluster of genes. For example, the causal discovery system 100 can select gene targets based on contribution values. Specifically, the causal discovery system 100 can generate/identify the gene targets 412 from the cluster of genes based on the contribution values 410. Moreover, the causal discovery system 100 can utilize a threshold approach to select one or more genes as the gene targets 412 based on the contribution values 410. For instance, the causal discovery system 100 can establish a significance threshold of 0.90, and genes from the cluster of genes with contribution values that satisfy the 0.90 threshold are selected as the gene targets 412. Similarly, the causal discovery system can select a threshold percentage of genes (e.g., the top 20% of genes based on contribution value).

In some embodiments, the causal discovery system 100 utilizes the machine learning classification model 402 and the explainability model 408 to perform univariate feature selection (e.g., select clinical features that have the strongest relationship with the clinical outcome predictions). The causal discovery system 100 can utilize a variety of explainability models, such as SHAP, LIME, Partial Dependent Plots, Feature Importance, or Counterfactual Explanations. For instance, the causal discovery system 100 utilizes an explainability model 408, such as SHAP (Shapley Additive Explanations), to determine the genes that contribute most significantly to the clinical outcome predictions 406 for that cluster. For example, the causal discovery system 100 utilizes SHAP to quantify the contribution of a clinical feature to a particular clinical outcome prediction. Specifically, SHAP is based on cooperative game theory and provides a way to distribute a total gain/loss of a game fairly among players (e.g., clinical features) based on their contributions. To determine the contribution values, the causal discovery system 100 can compute the marginal contribution of each clinical feature by considering all possible subsets of features (e.g., the difference in a model's prediction with and without the clinical feature is calculated). In other words, the causal discovery system 100 can permute, perturb, or modify the input features (e.g., genes) to generate the clinical outcome predictions 406 and compute the marginal contribution of the input features (e.g., the genes) by measuring the variations in the clinical outcome predictions 406 relative to the perturbations in the input features. Thus, a contribution value for a clinical feature is a measure (e.g., the average) of its marginal contributions across permutations of clinical feature subsets.

To illustrate, the causal discovery system 100 can represent generating a target explainability-performance (e.g., summary score) as:

$$EP(g_i) = \frac{ROC_{c_{g_i}} - 0.5}{STD_{ROC}} \frac{PR_{c_{g_i}} - Ref_{PR}}{STD_{PR}} rSHAP_{g_i}$$

$$rSHAP_{g_i} = softmax(SHAP_{g_i}) = \frac{e^{SHAP_{g_i}}}{\sum_j e^{SHAP_{g_j}}}$$

For instance, the causal discovery system 100 determines a ROC-AUC measure (e.g., Receiver Operating Characteristic-Area Under the Curve, indicates the trade-off between true positive rates and false positive rates, a higher AUC indicates better performance for the model relative to the clinical outcome prediction; for example, the causal discovery system 100 generates AUC scores for the clinical features of the cluster of genes), or an Area Under the Precision-Recall Curve (e.g., similar to ROC-AUC, assesses the trade-off between precision and recall at different thresholds).

As shown in the above notation, $$ROC_{c_{g_i}}$$

indicates a ROC-AUC of a 5-fold cross-validation using the clinical features of a gene. A 5-fold cross-validation refers to a techniques to assess the performance and generalizability of a model where a data set (e.g., the clinical features corresponding to the cluster of genes) is divided into five equal parts, trained on four parts and tested on the remaining part. The causal discovery system 100 repeats this process five times, with each part/fold serving as the test set once. Furthermore, the causal discovery system 100 averages the results and provides it as an overall performance metric.

Moreover, as shown in the above notation, $$PR_{c_{g_i}}$$

indicates a PR-AUC of 5-fold cross-validation using the cluster of gene (e.g., the clinical features corresponding to a gene of the cluster of genes). In contrast to ROC-AUC, PR-AUC focuses on a tradeoff between precision (e.g., positive predicted value) and recall (e.g., sensitivity) at different thresholds. Additionally, $STD_{ROC}$ and $STD_{PR}$ act as normalization factors. Further, $Ref_{PR}$ acts as a mean for the null distribution of PR-AUC. Accordingly, the causal discovery system 100 utilizes a softmax layer of the explainability model 408 to determine $rSHAP_{g_i}$ and combines that with normalized $$ROC_{c_{g_i}}$$

and the normalized $$PR_{c_{g_i}}$$

to determine the explainability-performance score (e.g., a contribution value).

As mentioned above, in some implementations, the causal discovery system 100 utilizes a causal discovery model to generate a causal prediction from features corresponding to the gene targets. For example, as shown in FIG. 5, the causal discovery system 100 utilizes a causal discovery model to generate a causal prediction between a gene and a clinical outcome in accordance with one or more embodiments.

As shown, the causal discovery system 100 utilizes a causal discovery model 502 to process features 500 corresponding to the gene targets identified by the machine learning classification model and the explainability model. As used herein, the term "causal discovery model" refers to a computer-implemented algorithm to determine causal relationships between certain genes and a clinical outcome. Specifically, the causal discovery system 100 utilizes the causal discovery model 502 to determine causal relationships among variables in a data set (e.g., genes and the clinical observation data set). For example, the causal discovery system 100 takes the gene targets and the corresponding clinical features and builds a graphical structure (e.g., a directed acyclic graph or a causal Bayesian network) where the nodes represent the variables (e.g., the gene targets and the corresponding clinical features) and the directed edges represent the causal relationships between the variables.

For instance, the causal discovery system 100 modifies variables of the graph and measures sensitivity to modifying the variables. Based on the sensitivity of the variables in the graph, the causal discovery system 100 generates a causal prediction. To illustrate, the causal discovery system 100 can utilize the causal discovery model 502 that includes Peter-Clark, Greedy Equivalence Search, NOTEARS (e.g., a gradient-based algorithm for linear data models with least-squares loss), MCSL (e.g., a gradient-based algorithm for non-linear additive noise data by learning a binary adjacency matrix), CI_GWAS, or DAG-GNN (e.g., directed acyclic graph-graph neural network).

Figure 5:
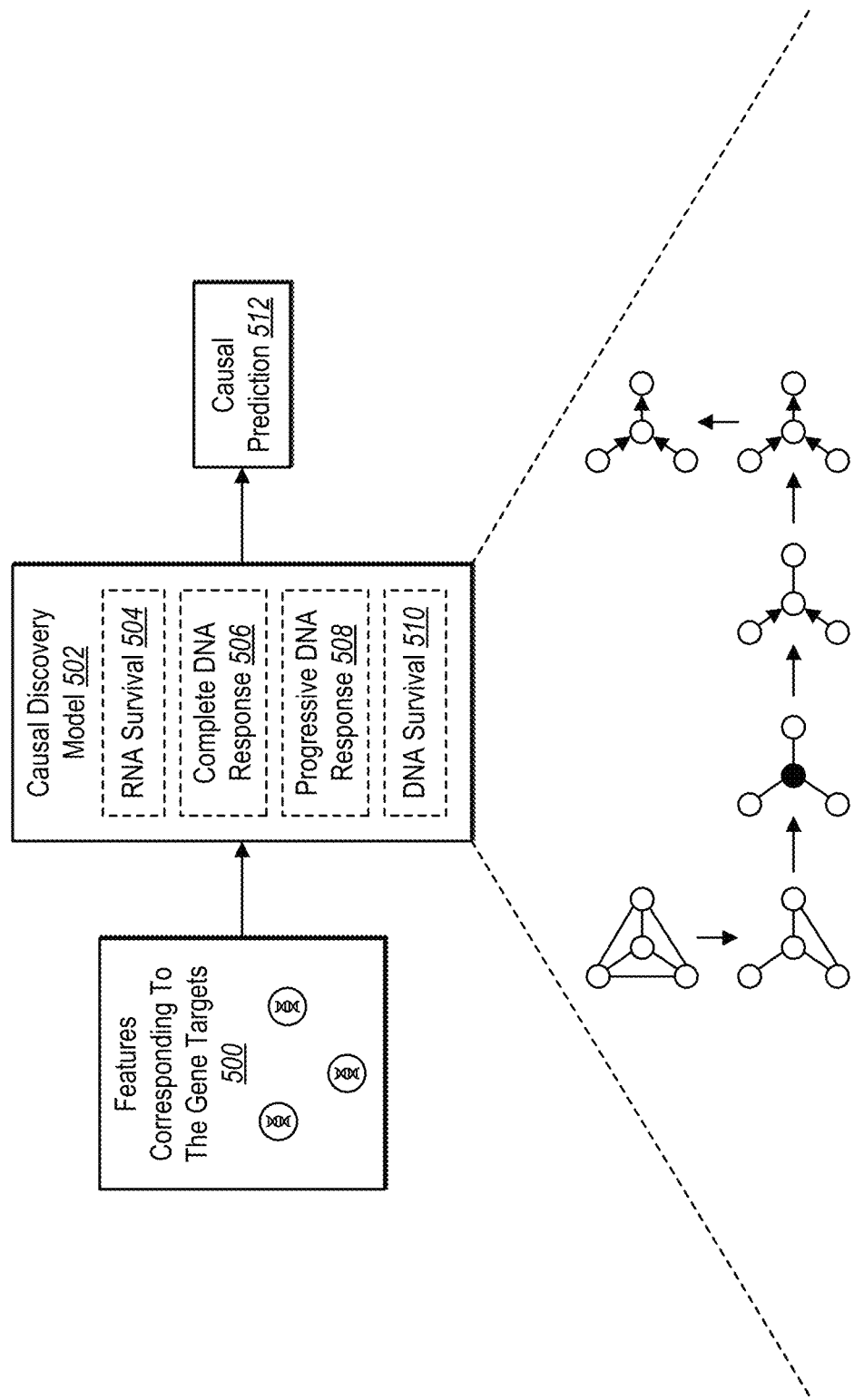
FIG. 5 illustrates an example diagram of the causal discovery system utilizing a causal discovery model to generate a causal prediction in accordance with one or more embodiments.

As shown in FIG. 5, the causal discovery model 502 builds a causal graph and determine a causal prediction 512. For instance, the causal discovery system 100 builds a fully connected graph (unidirectional) where each node represents clinical features or the gene targets, and each edge represents a potential causal relationship. Furthermore, the causal discovery system 100 removes edges of the fully connected graph based on two nodes being conditionally independent. Moreover, the causal discovery system 100 orients colliders and applies additional constraints such that there are not new v-structures (e.g., v-structures are three variables where there are two parent variables, and each point comes to a common child variable) and no directed cycles (e.g., no loops back to parent nodes).

As shown, the causal discovery system 100 generates a causal prediction 512 (e.g., between a gene and a clinical outcome) from the features 500 corresponding to the gene targets by using the causal discovery model 502. As used herein, the term "causal prediction" refers to a causal relationship between one or more genes (e.g., one or more gene targets) and a clinical outcome. For example, a causal prediction can indicate a measure of causal connection or relationship (e.g., a measure that one variable directly influences another variable). For instance, a causal prediction can include a measure or value indicating the extent to which one or more genes target directly influences a clinical outcome. Specifically, a causal prediction can include a relationship between an individual gene and a clinical outcome, a plurality of individual genes and a clinical outcome or a relationship between a group of related/similar genes (e.g., a gene group) and a clinical outcome (e.g., where the relationship is tied to the group as a whole and not individual genes of the group).

In one or more embodiments, the causal discovery system 100 utilizes the causal discovery model 502 to analyzes a group of features (e.g., actual features recorded from clinical observations or data representations/embeddings extrapolated from the clinical observation data set discussed above) corresponding to a single gene target (e.g., of the gene targets) to determine the causal prediction 512 between the single gene and a clinical outcome. In some embodiments, the causal discovery system 100 utilizes the causal discovery model 502 to analyze features corresponding to individual genes collectively to determine the causal prediction 512 between the individual genes and a clinical outcome. Moreover, in some embodiments, the causal discovery system 100 utilizes the causal discovery model 502 to analyze features corresponding to a group of gene targets to determine the causal prediction 512 between the group of gene targets and a clinical outcome.

As used herein, the term "clinical outcome" refers to a result, effect, or product of a clinical treatment or disease. For example, a clinical outcome can include a measure of survivability, disease progression, disease response, a metastatic manifestation of the disease (e.g., progression of a cancer from a primary site to another site in the body). The clinical outcome can include binary outcomes or outcomes on a gradation (e.g., occurring on a spectrum, score, or rating scale). For example, "survivability" refers to a measure of an individual surviving a disease, condition, or treatment. For instance, survivability can include overall survival (e.g., a binary indicator) or a progression-free survival (e.g., the disease did not progress, and the subject survived). For instance, survival can include survival beyond a year, survival less than a year and different time variations of survival. Furthermore, the term "progression" refers to the worsening or advancement of a disease, such as an increase in the severity of symptoms or the spread of the disease. Additionally, the term "disease response" can refer to the effectiveness of a specific intervention in achieving a desired outcome such as tumor shrinkage or symptom relief.

As shown in FIG. 5, in some embodiments, the causal discovery model 502 can include an RNA survival model 504, a complete DNA response model 506, a progressive DNA response model 508, or a DNA survival model 510. In one or more embodiments, the causal discovery system 100 utilizes the causal framework for clinical outcomes such as response and survival. Specifically, the causal discovery system 100 can utilize the causal framework to determine causal relationships between a gene target and a clinical outcome of a complete response, a progressive response, survival, or some combination of clinical outcomes. For example, the causal discovery system 100 utilizes the causal framework to determine a causal prediction between a gene target and one of the aforementioned outcomes based on different combinations of molecular data such as DNA and/or RNA data (e.g., using DNA or RNA data and corresponding clinical features for generating gene targets and generating causal predictions).

As used herein, the term "survival" refers to a specific intervention resulting in survival of a subject. For instance, survival can include overall survival (e.g., a subject lives, regardless of the quality of life). For instance, the causal discovery system 100 trains the RNA survival model 504 with clinical RNA data for a specific cluster of genes.

Specifically, the causal discovery system 100 trains a machine learning classification model with the RNA data and clinical features that correspond to a specific cluster of genes by comparing a clinical outcome prediction related to RNA survival to an observed clinical outcome (e.g., survival)

For instance, the causal discovery system 100 utilizes a machine learning classification model to process RNA profile data for a specific gene of the cluster of genes (e.g., gene information; RNA expression data such as tissue type, conditions, expression units; interpretation of RNA data such as higher expression in tumors or a tissue-specific type of expression) and corresponding clinical features such as gender, race, age, survival rates, treatment, and response to treatments. Specifically, similar to the description in FIG. 3, the causal discovery system 100 processes the RNA profile data corresponding to a first gene of the cluster of genes and generates a clinical outcome prediction for the first gene related to RNA survivability (e.g., based on the RNA profile data, the machine learning classification model classifies a likelihood of the data being tied to the clinical outcome of survivability). Moreover, the causal discovery system 100 compares the clinical outcome prediction for the first gene related to RNA survivability with an observed clinical outcome to determine a measure of loss and modify the parameters of the machine learning classification model. Further, the causal discovery system 100 can iteratively repeat this process for each remaining gene of the cluster of genes (e.g., a second and third gene of the cluster of genes).

At inference time, the causal discovery system 100 can utilize the machine learning classification model to generate the clinical outcome prediction for a gene of a cluster of genes and further can utilize the explainability model to generate the gene targets based on the RNA data of the genes of the cluster of genes and the clinical features. For instance, the causal discovery system 100 can generate the clinical outcome predictions and then utilize the explainability model to generate contributing values of the clinical outcome predictions. In other words, the causal discovery system 100 can determine how much each clinical feature processed by the machine learning classification model (e.g., RNA profile data specific to genes of the cluster of genes and additional clinical features such as sex, race, age, comorbidities, etc.) contributes to the clinical outcome prediction. Moreover, the causal discovery system 100 utilizes the causal discovery model 502 to process the features (e.g., the RNA data and the clinical features) to generate the causal prediction 512.

Like the RNA survival model 504, the causal discovery system 100 similarly implements the DNA survival model 510 by training the DNA survival model with DNA data and clinical features corresponding to the cluster of genes. For instance, the causal discovery system 100 utilizes a machine learning classification model to process DNA data for a specific cluster of genes that includes nucleotide sequence, gene annotations, gene names/identifiers, organism information, genomic location of the genes of the cluster of genes, sequence features (e.g., mutations, repetitive elements, variations, etc.), and additional clinical features. From the processing the clinical features that correspond to the cluster of genes, the causal discovery system 100 can utilize the machine learning classification model to generate clinical outcome predictions and compare the clinical outcome predictions with observed clinical outcomes. From the comparison, the causal discovery system 100 can determine a measure of loss and modify parameters of the machine learning classification system.

At inference time, the causal discovery system 100 can implement the trained machine learning classification system (e.g., trained as the DNA survival model 510) to process clinical features corresponding to a cluster of genes to generate the clinical outcome predictions and further utilize an explainability model to generate contribution values of clinical features that resulted in the clinical outcome predictions. Moreover, the causal discovery system 100 can utilize the causal discovery model 502 trained for DNA survival to generate a causal prediction based on identifying gene targets from the explainability model.

As used herein, the term "complete response" refers to a specific intervention resulting in a complete response. Specifically, the complete response can include a complete disappearance of a tumor in response to a treatment targeting a gene target. Similar to the RNA survival model 504, the causal discovery system 100 trains the complete DNA response model 506 utilizing clinical features and DNA data (e.g., gene information; DNA sequence variations such as a reference sequence and common mutations; interpretation of DNA data such various mutations; different DNA variants; and DNA sequence context e.g., sequences preceding and proceeding the specific gene) for a specific cluster of genes.

For instance, the causal discovery system 100 utilizes a machine learning classification model to process the clinical features and DNA data (e.g., for complete DNA response) for a specific cluster of genes. Further, the causal discovery system 100 can generate clinical outcome predictions from processing the specific clinical features corresponding to the cluster of genes and compare the clinical outcome predictions with observed clinical outcomes. From the comparison, the causal discovery system 100 generates a measure of loss to modify parameters of the machine learning classification model specific for classifying complete DNA responses. Moreover, at inference time, the causal discovery system 100 utilizes both the DNA data and the clinical features corresponding to the cluster of genes to generate a clinical outcome prediction, generate contribution values (e.g., using the explainability model) and generate a causal prediction for a complete DNA response. In other words, the causal discovery system utilizes a trained complete DNA response model 506 to identify a specific gene of a cluster of genes having a causal relationship with the clinical outcome of complete DNA response for a specific disease.

As used herein, the term "progressive response" refers to a specific intervention resulting in a progressive response. Specifically, the progressive response could refer to a progressive worsening of a disease or a progressive improvement of a disease in response to targeting a gene target. Likewise, the causal discovery system 100 trains the progressive DNA response model 508 using the DNA data and the clinical features corresponding to the cluster of genes. For instance, as described above, the causal discovery system 100 utilizes a machine learning classification model to process specific DNA data (e.g., and additional clinical features) corresponding to a specific cluster of genes to generate clinical outcome predictions. The causal discovery system 100 then compares the clinical outcome predictions with observed clinical outcomes to determine a measure of loss and modify parameters of the machine learning classification model to be tuned for classifying progressive DNA responses.

Additionally, at inference time, the causal discovery system 100 generates clinical outcome predictions from clinical features (e.g., DNA data) specific to a cluster of genes and further determines contribution values for the clinical outcome predictions. Further, the causal discovery system 100 can identify gene targets from the contribution values and generate (e.g., utilizing a causal discovery model for progressive DNA response) a causal prediction for a specific gene of the cluster of genes and the clinical outcome of progressive DNA response for a specific disease.

In one or more embodiments, the causal discovery system 100 utilizes a causal discovery model that draws from a combination of both RNA and DNA data (e.g., a multimodal model that combines DNA and RNA features). Specifically, the causal discovery system can utilize a combination causal discovery model that processes a specific cluster of genes and matched DNA and/or matched RNA data that lines up with a specific clinical outcome. In doing so, the causal discovery system 100 can generate a causal prediction between a gene target of the cluster of genes and the specific clinical outcome by leveraging both the DNA and RNA data that corresponds with the cluster of genes.

Moreover, in some embodiments, the causal discovery system 100 can train a causal discovery framework (e.g., that includes the machine learning classification model, explainability model, and the causal discovery model) on different subtypes of diseases (e.g., cancers, such as adenocarcinoma, non-small cell lung cancer, and squamous cell lung cancer). For instance, the causal discovery system 100 can process the clinical features that correspond with clusters of genes for both adenocarcinoma and squamous cell lung cancer.

As discussed above, the causal discovery system 100 generates the causal prediction 512 between gene(s) and a clinical outcome. In one or more embodiments, the causal discovery system 100 additionally identifies patient groups from the causal prediction 512. Specifically, the causal discovery system 100 identifies a specific patient segment for a disease tied to a specific gene. To illustrate, if the causal prediction 512 indicates a causal relationship between an EGFR gene and a clinical outcome of survival, the causal discovery system 100 further identifies non-small cell lung cancer as a patient group. Thus, in addition to identifying causal relationships between genes and clinical outcomes, the causal discovery system 100 also can identify one or more patient groups that are tied to the causal prediction.

In one or more embodiments, the causal discovery system 100 further utilizes interim metrics to generate the causal prediction 512. Specifically, the causal discovery system 100 determines sensitivity scores in generating the causal prediction 512. As mentioned above, the causal discovery system 100 modifies variables of the graph and measures sensitivity to modifying the variables. These sensitivity scores reflect the causal connection between various features and a particular clinical outcome. Additionally, in building a causal discovery model, the causal discovery system 100 generates a measure of directionality (e.g., a measure of a gene having a positive impact on an outcome or a negative impact on an outcome).

Figure 6:
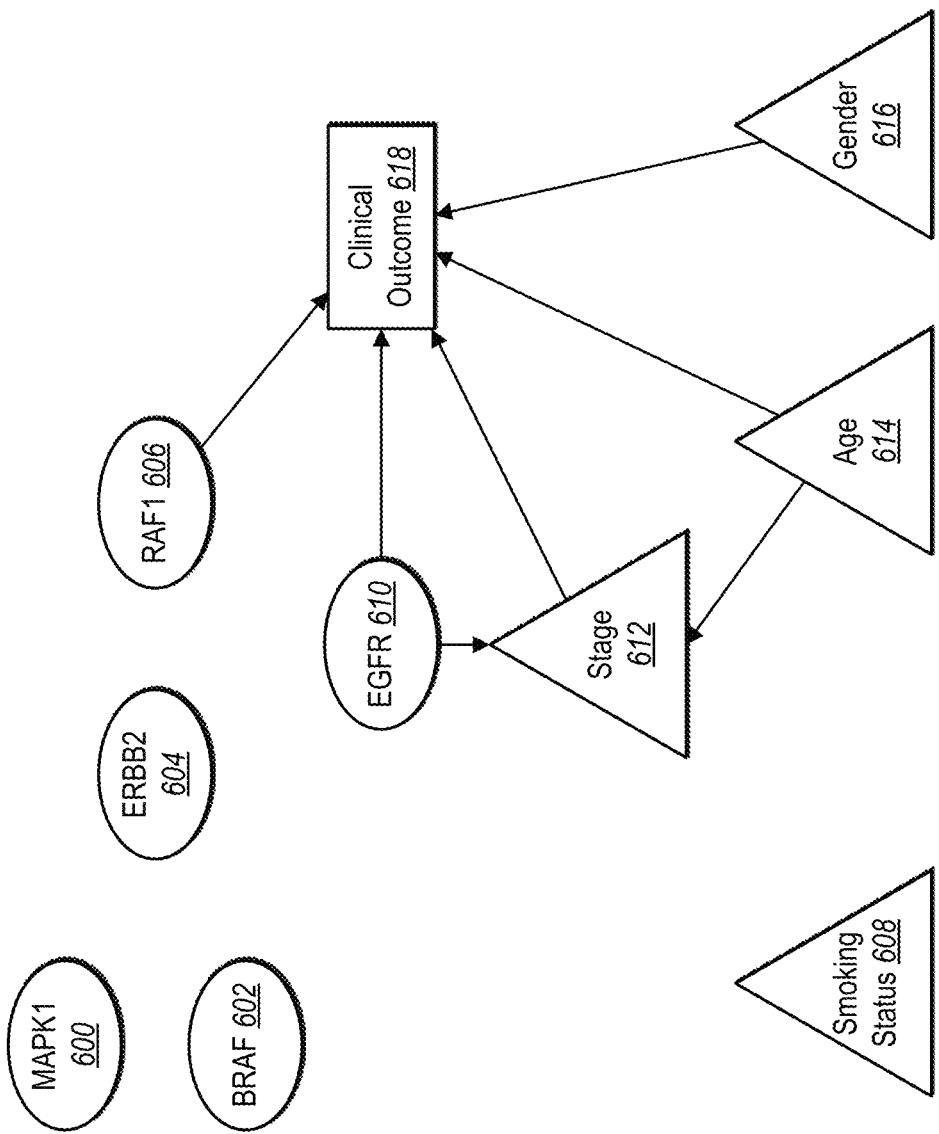
FIG. 6 illustrates an example of the causal discovery system building a causal graph to determine a causal prediction between a gene and a clinical outcome in accordance with one or more embodiments.

For instance, the causal discovery system 100 builds a causal graph to find which gene has a causal relationship with a clinical outcome. FIG. 6 illustrates the causal discovery system 100 building a causal graph of the gene targets. For instance, FIG. 6 shows gene targets that include MAPK1 600, BRAF 602, ERBB2 604, RAF1 606, and EGFR 610. Moreover, FIG. 6 shows clinical features that include smoking status 608, stage 612, age 614, and gender 616.

As highlighted above, the causal discovery system 100 builds the causal graph and removes edges between nodes based on the nodes being conditionally independent. FIG. 6 shows the causal discovery system 100 using DNA to predict a binary survival outcome. Thus, FIG. 6 shows the causal discovery system 100 predicting a causal relationship between the EGFR gene, the RAF1 gene and a clinical outcome 618 of survival.

Figure 7:
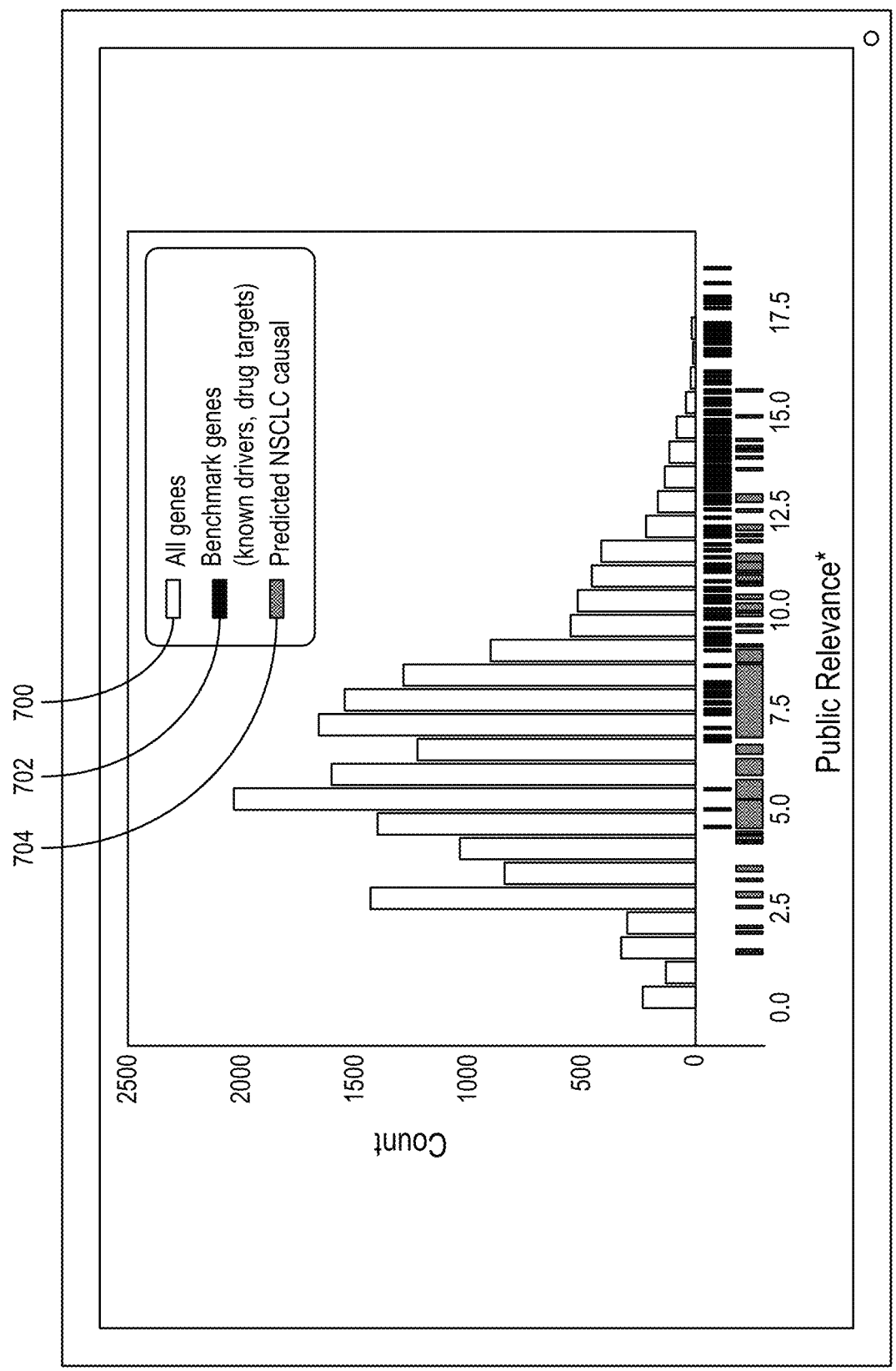
FIG. 7 illustrates an example graphical user interface of the causal discovery system causing a graphical user interface to display rating metrics in tandem with causal predictions in accordance with one or more embodiments.

As mentioned above, the causal discovery system 100 can generate a causal prediction and provide the generated causal prediction to a client device. In some implementations, the causal discovery system 100 can provide these causal predictions for display with other benchmarking indicators to identify those causal predictions for further exploration or analysis in downstream tasks. For instance, the causal discovery system 100 can display causal predictions of genes together with public relevance indicators to identify those genes that have previously not been significantly analyzed for treatment of a particular disease. For example, FIG. 7 illustrates the causal discovery system 100 causing a graphical user interface to display a histogram of genes with a public relevance metric as the x-axis and a count of the genes as the y-axis. As used herein, the term "public relevance" relates to a rating metric that indicates the availability of public data, studies, and experiments related to a specific gene contributing to a specific disease (e.g., cancer).

For instance, in some implementations, the causal discovery system 100 determines the public relevance by identifying a predicted biological relationship (e.g., between a gene and a clinical outcome, as identified by a causal prediction) and utilizes a large language model to generate a rating metric for the predicted biological relationship based on data available in various datasets (e.g., a cancer database). For example, the rating metric can include gene impact rating metrics, previous analysis rating metrics, tractability rating metrics, directionality metric, biological rationale metric, and a differentiator metric (e.g., each rating metric is scored based on different rating instructions).

As mentioned above, the "directionality metric" refers to a measure of a gene having a positive impact on an outcome (e.g., survival) or a negative impact on an outcome (e.g., survival). Further, the "biological rationale metric" refers to evidence of a biological relationship for a predicted biological relationship (e.g., in the current scientific literature). For instance, the biological rationale metric refers to gene relevance in any cancer indication based on public knowledge datasets. Moreover, the "differentiator metric" refers to an indication of differentiation relative to known genes. In other words, the differentiator metric includes a measure of a predicted biological relationship (e.g., between a gene and a clinical outcome) being unexplored.

To illustrate, the causal discovery system generates the rating metric (e.g., described above) by using the methods described in application Ser. No. 18/521,910, titled UTILIZING BIOLOGICAL MACHINE LEARNING REPRESENTATIONS AND A LANGUAGE MACHINE LEARNING MODEL FOR INITIATING COMPOUND EXPLORATION PROGRAMS, filed on Nov. 28, 2023, which is fully incorporated by reference in its entirety herein.

FIG. 7 illustrates an example of what the causal discovery system 100 can provide to a client device to analyze the value and importance of certain causal predictions. In other words, the causal discovery system 100 generates causal predictions, and measures that show a low public relevance (e.g., the causal prediction is not well-known in the field), can be considered valuable for further downstream exploration.

FIG. 7 shows all genes 700 as the bars, benchmark genes 702 as the filled-in box, and predicted NSCLC causal 704 as the dotted-pattern on the bottom row of the user interface (e.g., NSCLC is non-small cell lung cancer). FIG. 7 shows markings below the histogram to indicate the benchmark genes 702 and the predicted NSCLC causal 704. As shown in FIG. 7, the benchmark genes 702 tend to be higher on the public relevance scale.

Moreover, FIG. 7 shows some predicted NSCLC causal 704 that are low on the public relevance scale, and thus can indicate a high value of exploration due to the lack of public data. In other words, causal predictions with low public relevance can indicate a gene that is causally related to non-small cell lung cancer. For instance, genes such as KRAS, EGFR, and TP53 have a causal relationship with NSCLC, however, these genes are also very well known in the public literature to have a relationship with NSCLC.

In one or more embodiments, the causal discovery system 100 can provide the graph shown in FIG. 7 as an interactive graph. Specifically, the causal discovery system 100 can provide options for a user of a client device to drill into specific data points. For instance, in response to user interaction, the causal discovery system can provide for display (e.g., via a pop-up or other information element) additional data regarding particular genes (e.g., causal prediction measures, gene identification information, related genes, related compounds for the gene, etc.). The causal discovery system 100 can also provide user interface elements (that when selected) initiate performance of additional analysis (e.g., generate a program rating score based on the public relevance and the causal prediction, initiate a program, etc.). For instance, the causal discovery system 100 utilizes the causal discovery framework discussed above to determine the causal predictions for the genes of the phenomic map and surface the determinations to the graphical user interface shown in FIG. 7.

Figure 8:
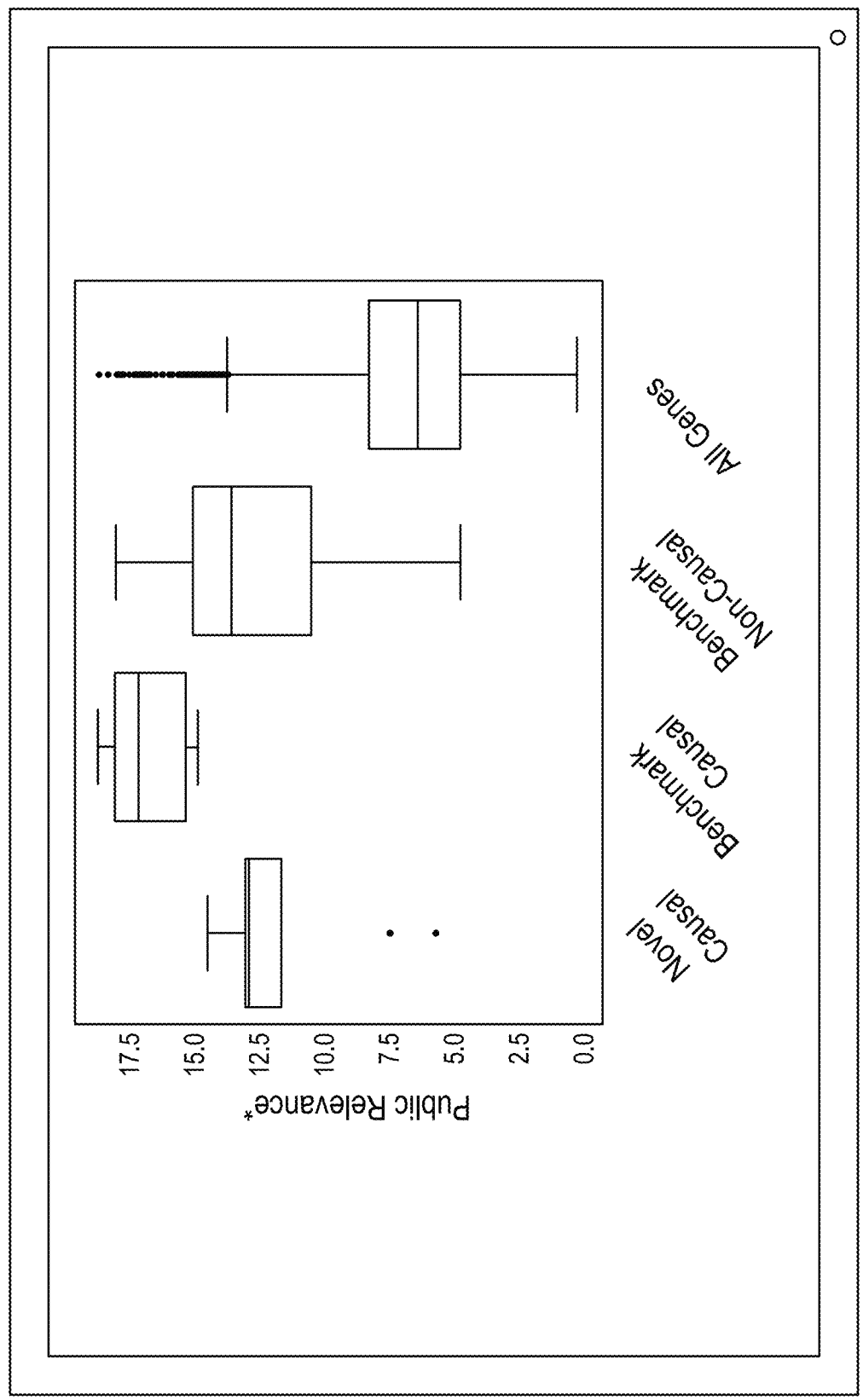
FIG. 8 illustrates an example graphical user interface of the causal discovery system causing a graphical user interface to display a box and whiskers plot of various groups and a corresponding rating metric of the various groups in accordance with one or more embodiments.

FIG. 8 illustrates the causal discovery system 100 providing a box and whiskers plot to a client device (e.g., as an additional approach to benchmarking causal discovery predictions) which indicates a distribution of novel causal relationships and causal relationship outliers (e.g., outliers in terms of a causal relationship between a gene and a clinical outcome having a low public relevance). Specifically, FIG. 8 shows novel causal relationships between genes and clinical outcomes, benchmark causal relationships between genes and clinical outcomes, benchmark non-causal relationships, and all genes. For instance, box-and-whisker plots are graphical representations of the distribution of a data set and highlights its central tendency, variability and outliers. For example, the top line of a box in a box-and-whiskers plot represents the $75^{th}$ percentile, the bottom line of the box represents the $25^{th}$ percentile and the line inside the box represents the $50^{th}$ percentile. The top whisker represents the largest value within one-and-a-half times the interquartile range above the $75^{th}$ percentile line of the box. The bottom whisker extends from the bottom of the box to the smallest value within one-and-a-half times the interquartile range below the 25th percentile line of the box. Points above the top whisker represent values greater than one-and-a-half times the interquartile range of the $75^{th}$ percentile and points below the bottom whisker represents values less than one-and-a-half times the interquartile range of the $25^{th}$ percentile.

As shown in FIG. 8, the causal discovery system 100 can uncover novel causal relationships and provide the box-and-whiskers plot to a client device. Accordingly, FIG. 8 shows the distribution of each of the shown categories and demonstrates the ability of the causal discovery system 100 to uncover valuable causal relationships that do not necessarily have a high public relevance.

For instance, FIG. 8 shows for identified novel causal relationships (e.g., novel predicted causal relationships between genes and a clinical outcome), benchmark causal relationships (e.g., known causal relationships between genes and a clinical outcome), benchmark non-causal (e.g., known benchmark genes that do not have a causal relationship to the clinical outcome), and all genes (e.g., a distribution of all the genes of a genome and their public relevance). To illustrate, FIG. 8 shows the causal discovery system 100 identifying two outlier points from the novel causal group, where the two outlier points are less than one-and-a-half times the interquartile range of the $25^{th}$ percentile. This demonstrates that the causal discovery system 100 can uncover causal relationship outliers between genes and clinical outcomes that are not well-known in the literature (e.g., have a low public relevance).

Like FIG. 7, the causal discovery system 100 can also provide the box-and-whiskers plot as an interactive interface for a user of the client device to drill into specific categories and uncover more granular data. Moreover, the causal discovery system 100 can allow for a user of the client device to initiate additional downstream processes (e.g., generating a program rating metric, initiating downstream experiments, etc.).

Figure 9:
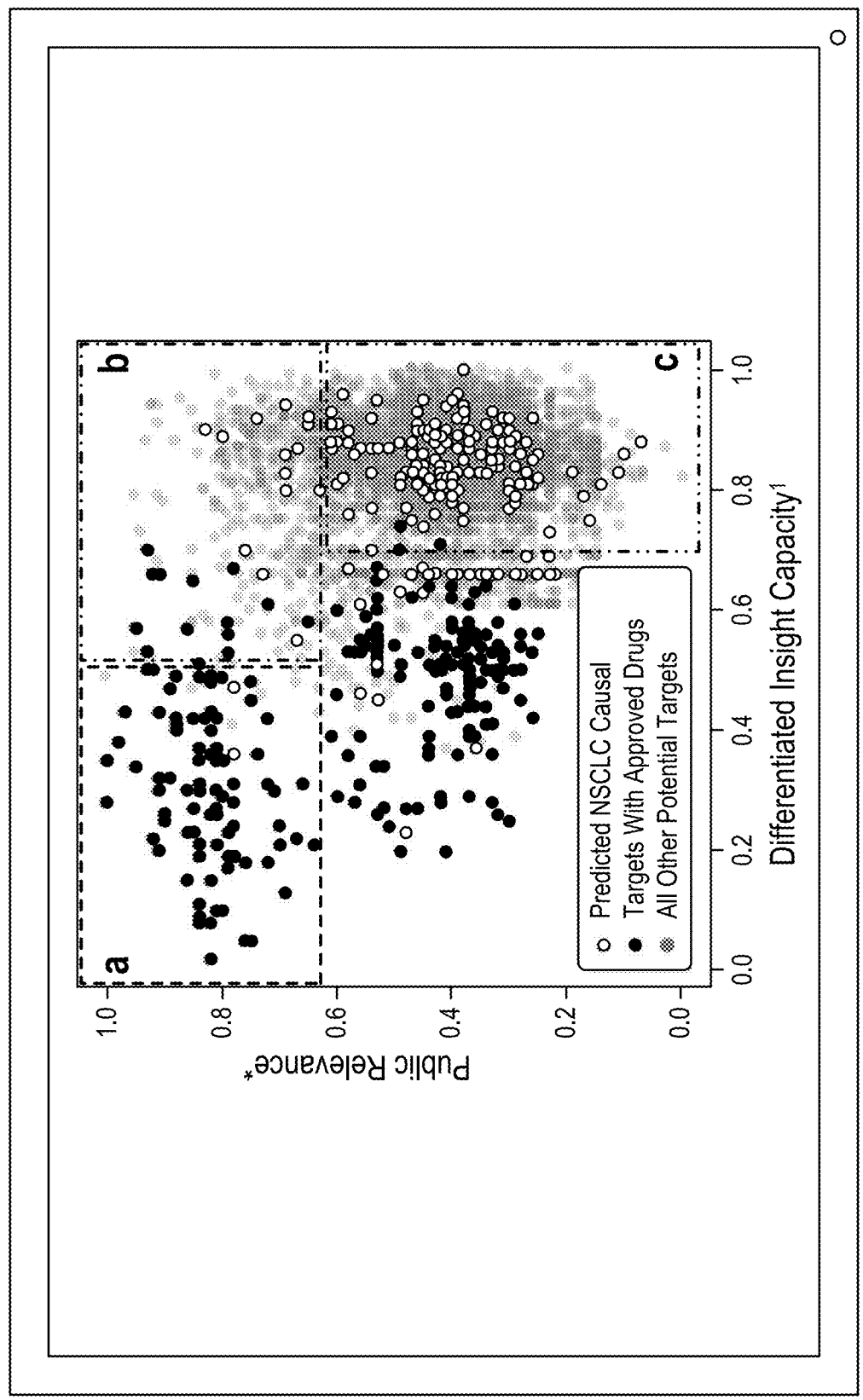
FIG. 9 illustrates an example graphical user interface of the causal discovery system causing a graphical user interface to display a graph of public relevance of predicted causal relationships in accordance with one or more embodiments.

FIG. 9 shows an additional graph that the causal discovery system 100 can cause a graphical user interface to display. As indicated by the graph in FIG. 9, each point on the graph indicates a gene and the graph further includes three primary quadrants, (a), (b), and (c). The y-axis of the graph shown in FIG. 9 indicates public relevance (e.g., gene relevance in any cancer indication based on public knowledge datasets) while the x-axis of the graph indicates the causal discovery system 100 utilizing large language models to query biological relationship datasets to determine differentiated insight capacity. For instance, the biological relationship datasets include data from phenomap inferences, scores generated by a compound-protein interaction machine learning model, and chemical tractability scores obtained from biological relationship datasets.

To illustrate, the causal discovery system 100 the differentiated insight capacity of a gene refers to a potential of the gene being unexplored or a measure of differentiation relative to known genes. For instance, the causal discovery system 100 utilizes phenomap inferences data sets to determine the differentiated insight capacity of a gene. For example, the causal discovery system 100 can utilize the phenomap inference dataset as described in application Ser. No. 18/526,707, titled, UTILIZING MACHINE LEARNING MODELS TO SYNTHESIZE PERTURBATION DATA TO GENERATE PERTURBATION HEATMAP GRAPHICAL USER INTERFACES, filed on Dec. 1, 2023, which is fully incorporated by reference herein in its entirety.

Moreover, the causal discovery system can utilize the compound-protein interaction machine learning model to generate scores for a gene and certain compounds that can indicate a potential measure of interaction between a gene and compound. For example, the causal discovery system 100 can utilize the compound-protein interaction machine learning model as described in application Ser. No. 18/505,728, titled UTILIZING COMPOUND-PROTEIN MACHINE LEARNING REPRESENTATIONS TO GENERATE BIOACTIVITY PREDICTIONS, filed on Nov. 9, 2023, which is fully incorporated by reference herein in its entirety.

As mentioned above, the causal discovery system 100 also utilizes chemical tractability scores to determine a differentiated insight capacity. As used herein, the term chemical tractability (or druggability), refers to a value, score, measure, or indication of influence of compounds or drugs. For example, tractability includes a measure of influence of compounds or drugs with regard to a particular disease or biological activity. Thus, tractability includes a measure of impact of a drug or compound in treating a disease (e.g., feasibility of treating a disease using a compound). Accordingly, the causal discovery system can determine the tractability of a specific gene in relation to a specific chemical compound for treating a disease and determine the differentiated insight capacity for the gene from the tractability score.

As mentioned, each point in the graph shown in FIG. 9 is a gene with a phenoprint, scored for public relevance (e.g., cancer relevance) based on public data and that gene's differentiated insight capacity. For instance, the causal discovery system 100 identifies a phenomap inference, a compound-protein interaction score, a chemical tractability score, and any additional rating metrics discussed above that correspond to a gene of interest. Based on the identification, the causal discovery system 100 can determine an overall (e.g., combined) differentiated insight capacity for the gene of interest.

As shown, well known established targets are in quadrant (a), such as TP53, KRAS, and EGFR. Further, known targets that are already of interest in the field yet remain undrugged are in quadrant (b) (e.g., MYC, STK11, and ARID1B). Moreover, potential novel causal gene targets (e.g., for NSCLC) are in quadrant (c). For instance, the potential novel causal gene targets in quadrant (c) have a high differentiated insight capacity (e.g., contain a high indication of an unexplored relationship with a causal relationship to a clinical outcome) and a low public relevance (e.g., thus quadrant (c) contains genes that are not well known in the scientific literature). Thus, FIG. 8 shows the ability of the causal discovery system 100 to uncover innovative targets that can potentially provide differentiated therapeutic potential for oncology research and development.

Similar to above, the causal discovery system 100 can provide the graph shown in FIG. 9 to a client device as an interactive graph. For instance, a user of a client device can hover over a dot on the graph and the causal discovery system 100 can cause the graphical user interface to display additional details regarding the dot of interest (e.g., gene information, causal predictions, related genes or compounds, research results, etc.). Moreover, the causal discovery system 100 can provide additional options for a user of a client device to select one or more dots to generate an updated program rating metric (e.g., a rating indicating whether to initiate a downstream exploration such as industrial program generation or industrial compound generation for a gene of interest) based on the causal relationship of the gene and a clinical outcome, the public relevance (e.g., various rating metrics) and the differentiated insight capacity (e.g., obtained from the phenomap inferences, compound-protein interaction machine learning scores, and the chemical tractability scores).

Figure 10:
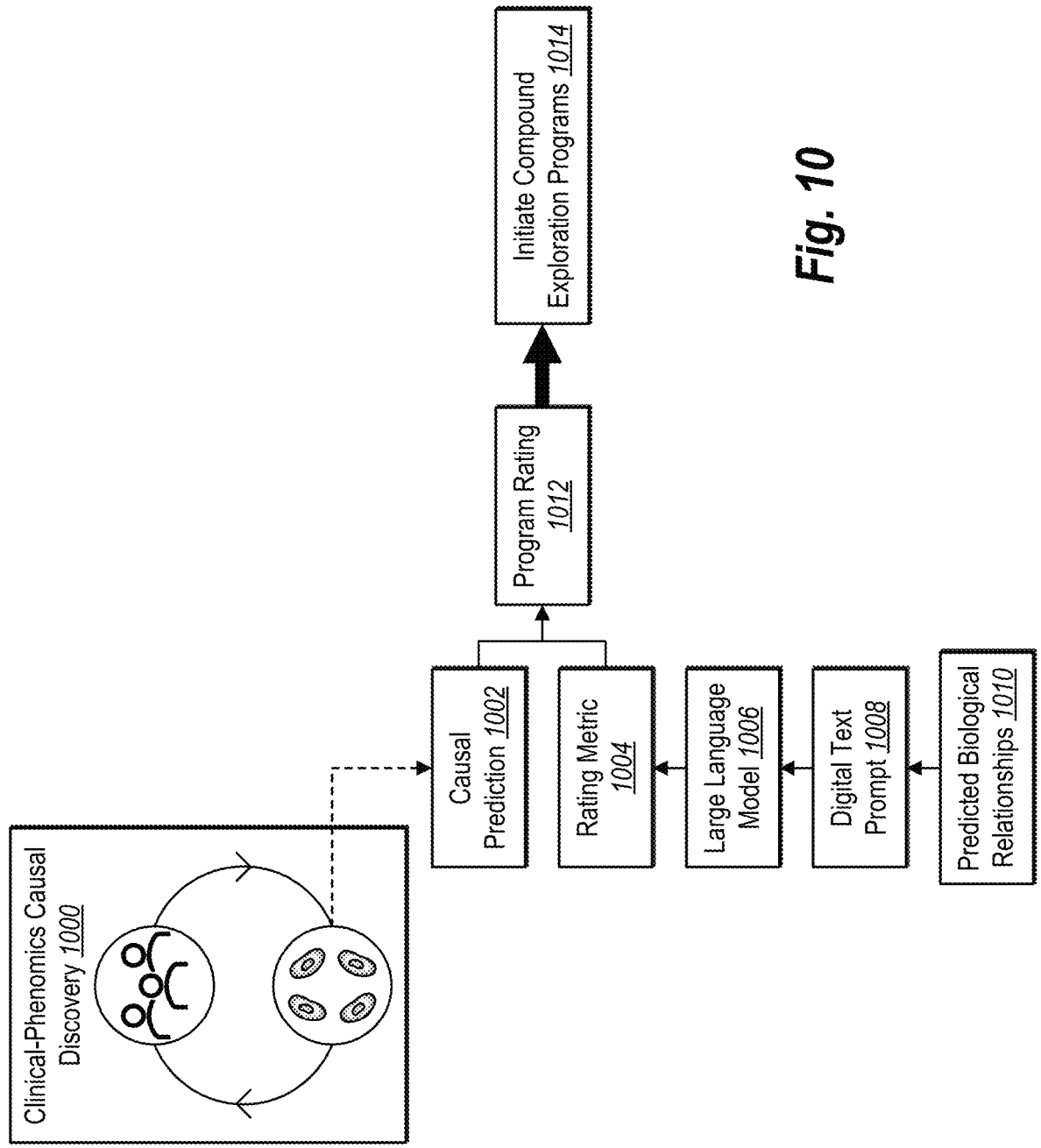
FIG. 10 illustrates an example diagram of the causal discovery system initiating a compound exploration program from a program rating in accordance with one or more embodiments.

As mentioned previously, the causal discovery system 100 can further leverage the causal prediction to initiate compound exploration programs. FIG. 10 shows the causal discovery system 100 combining both the causal prediction and the rating metric to generate a program rating in accordance with one or more embodiments.

As shown in FIG. 10, the causal discovery system 100 can generate a causal prediction 1002 from a clinical-phenomics causal discovery 1000 (e.g., a causal discovery framework) and further generate a rating metric 1004. Specifically, the causal discovery system 100 can utilize predicted biological relationships 1010 to generate a digital text prompt 1008, and further process the digital text prompt 1008 utilizing a large language model 1006.

In one or more embodiments, the causal discovery system 100 generates rating metrics utilizing the large language model 1006 which includes a language machine learning model or a language transformer model. As used herein, the term "large language model" includes or refers to one or more neural networks capable of processing natural language text to generate outputs that range from predictive outputs, analyses, or combinations of data within stored content items. In particular, a large language model can include parameters trained (e.g., via deep learning) on large amounts of data to learn patterns and rules of language for summarizing and/or generating digital content. Examples of large language model include BLOOM, Bard AI, ChatGPT (e.g., GPT-3, GPT-4, etc.), LaMDA, DialoGPT.

Moreover, as shown, the causal discovery system 100 utilizes the large language model 1006 to generate a rating metric. As mentioned, the causal discovery system 100 provides the digital text prompt 1008 to the large language model 1006, the digital text prompt 1008 includes text rating instructions for the large language model 1006. In one or more embodiments, the causal discovery system 100 generates the rating metric 1004 according to the text rating instructions. Accordingly, for a scoring rubric from 0-5, the causal discovery system 100 receives from the large language model a rating from 0 to 5 as the rating metric and for a binary text rating instruction, the causal discovery system 100 receives a yes or no.

Furthermore, as shown, the causal discovery system 100 combines the causal prediction 1002 and the rating metric 1004 to generate a program rating 1012. For instance, the causal discovery system 100 receives multiple rating metrics from multiple digital text prompts and combines the rating metrics and the causal prediction to determine the program rating. Specifically, the program rating indicates whether to initiate one or more compound exploration programs.

Moreover, in some embodiments, the causal discovery system 100 combines the causal prediction 1002 with the rating metric 1004 by determining if the rating metric 1004 satisfies a predetermined threshold (e.g., greater than 3 on a scale from 0-5). If so, the causal discovery system 100 causes the program rating 1012 to indicate a 5 based on the discovered causal prediction in tandem with the rating metric 1004 that satisfies a threshold.

As shown in FIG. 10, based on the program rating 1012, the causal discovery system 100 can determine to initiate compound exploration programs 1014. The compound exploration programs can include industrial program generation (IPG) and industrialized compound generation (ICG). For instance, industrial program generation (IPG) includes (i) a hit selection to identify statistically strong connections in a biological map to patient-informed phenotypes, (ii) phenomic confirmation (e.g., promising actives are confirmed by automated similarity and concentration-response analytics), (iii) Trekseq confirmation (e.g., compound and gene relationships are confirmed with transcriptomics in the map background), and (iv) Structure-Activity Relationship (SAR) confidence (e.g., actives that behave as a series are identified, and an automated recommendation for expansion is identified).

ICG applies to steps subsequent to IPG. Further, in some embodiments ICG includes rapidly searching and expanding from potential hit series in the chemical space (e.g., identified at the IPG stage) and testing the potential hits with various analytical tests (e.g., SAR screens). Accordingly, in some embodiments the causal discovery system 100 can initiate IPG and/or ICG in response to generating a program rating metric from the rating metric and the causal prediction. Moreover, the causal discovery system can transmit, provide, or utilize sensitivity scores and/or directionality scores in these IPG or ICG pipelines (e.g., for developing or analyzing compounds for treatment of a particular disease).

As mentioned above, conventional systems suffer from accurately and efficiently identifying causal relationships between certain genes and clinical outcomes due to the high dimensionality of data. In one or more embodiments, the causal discovery system 100 improves upon the accuracy of conventional systems by further leveraging the rating metric 1004 and the causal prediction 1002 to generate the program rating 1012. For instance, the causal discovery system 100 can more accurately determine which compound exploration programs to initiate based on the combined score of the causal prediction 1002 and the rating metric 1004 because the rating metric further narrows down genes of interest that are not well known in the public literature.

Related to the accuracy improvement, the causal discovery system 100 improves upon efficiency of conventional systems by leveraging the program rating. In doing so, the causal discovery system 100 can avoid wasting valuable time and computational resources in running experiments to develop pharmaceutical compounds for drugs that are already well-known or developed in the literature. Accordingly, the causal discovery system 100 leverages both the causal prediction between a gene and a clinical outcome and the rating metric to filter down to the most valuable potential experiments.

Additional detail regarding the causal discovery system 100 will now be provided with reference to the figures. In particular, FIG. 11 illustrates a schematic diagram of a system environment in which the causal discovery system 100 can operate in accordance with one or more embodiments.

Figure 11:
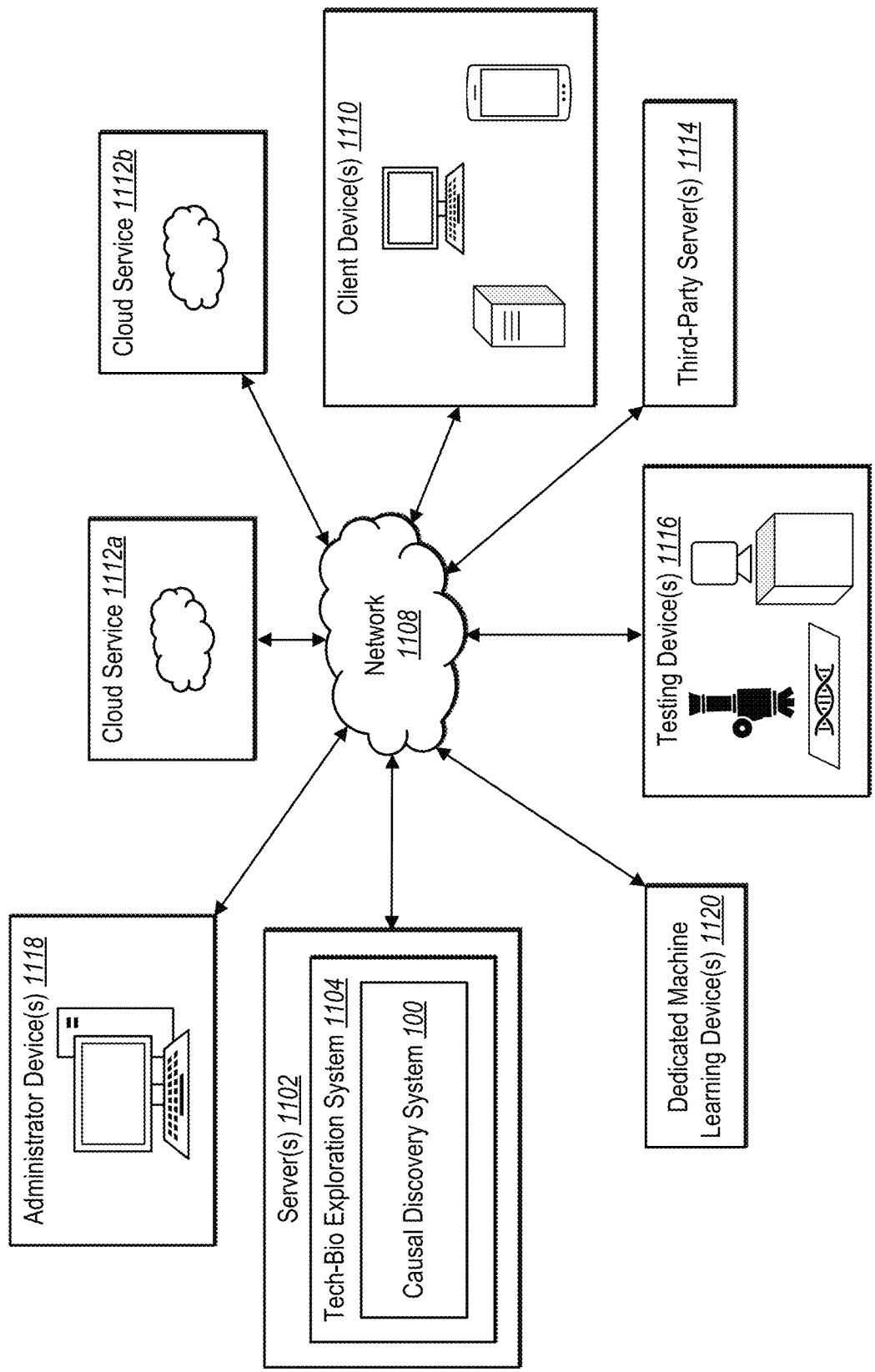
FIG. 11 illustrates an example environment of the causal discovery system in accordance with one or more embodiments.

As shown in FIG. 11, the environment includes server(s) 1102 (which includes a tech-bio exploration system 1104 and the causal discovery system 100), a network 1108, client device(s) 1110, cloud service(s) 1112a-1112b, third-party server(s) 1114, testing device(s) 1116, administrator device(s) 1118, and dedicated machine learning device(s) 1120. As further illustrated in FIG. 11, the various computing devices within the environment can communicate via the network 1108. Although FIG. 11 illustrates the causal discovery system 100 being implemented by a particular component and/or device within the environment, the causal discovery system 100 can be implemented, in whole or in part, by other computing devices and/or components in the environment (e.g., the administrator device(s) 1118, the client device(s) 1110). Additional description regarding the illustrated computing devices is provided with respect to FIG. 13 below.

As shown in FIG. 11, the server(s) 1102 (e.g., one or more local servers operated by a particular entity) can include the tech-bio exploration system 1104. In some embodiments, the tech-bio exploration system 1104 can determine, store, generate, and/or display tech-bio information including maps of biology, biology experiments from various sources, and/or machine learning tech-bio predictions. For instance, the tech-bio exploration system 1104 can analyze data signals corresponding to various treatments or interventions (e.g., compounds or biologics) and the corresponding relationships in genetics, protenomics, phenomics (i.e., cellular phenotypes), and invivomics (e.g., expressions or results within a living animal).

For instance, the tech-bio exploration system 1104 can generate and access experimental results corresponding to gene sequences, protein shapes/folding, protein/compound interactions, phenotypes resulting from various interventions or perturbations (e.g., gene knockout sequences or compound treatments), and/or in vivo experimentation on various treatments in living animals. By analyzing these signals (e.g., utilizing various machine learning models), the tech-bio exploration system 1104 can generate or determine a variety of predictions and inter-relationships for improving treatments/interventions.

To illustrate, the tech-bio exploration system 1104 can generate maps of biology indicating biological inter-relationships or similarities between these various input signals to discover potential new treatments. For example, the tech-bio exploration system 1104 can utilize machine learning and/or maps of biology to identify a similarity between a first gene associated with disease treatment and a second gene previously unassociated with the disease based on a similarity in resulting phenotypes from gene knockout experiments. The tech-bio exploration system 1104 can then identify new treatments based on the gene similarity (e.g., by targeting compounds the impact the second gene). Similarly, the tech-bio exploration system 1104 can analyze signals from a variety of sources (e.g., protein interactions, or in vivo experiments) to predict efficacious treatments based on various levels of biological data.

The tech-bio exploration system 1104 can generate GUIs comprising dynamic user interface elements to convey tech-bio information and receive user input for intelligently exploring tech-bio information. Indeed, as mentioned above, the tech-bio exploration system 1104 can generate GUIs displaying different maps of biology that intuitively and efficiently express complex interactions between different biological systems for identifying improved treatment solutions. Furthermore, the tech-bio exploration system 1104 can also electronically communicate tech-bio information between various computing devices.

As shown in FIG. 11, the tech-bio exploration system 1104 can include a system that facilitates various models or algorithms for generating maps of biology (e.g., maps or visualizations illustrating similarities or relationships between genes, proteins, diseases, compounds, and/or treatments) and discovering new treatment options over one or more networks. For example, the tech-bio exploration system 1104 collects, manages, and transmits data across a variety of different entities, accounts, and devices. In some cases, the tech-bio exploration system 1104 is a network system that facilitates access to (and analysis of) tech-bio information within a centralized operating system. Indeed, the tech-bio exploration system 1104 can link data from different network-based research institutions to generate and analyze maps of biology.

As shown in FIG. 11, the tech-bio exploration system 1104 can include a system that comprises the causal discovery system 100 that generates gene perturbation embeddings, generates clusters of genes, performs features/gene cluster selection using a machine learning classification model and explainability model, and further generates causal predictions between a gene and a clinical outcome utilizing a causal discovery model. For example, the causal discovery system 100 can generate the gene perturbation embeddings from a phenomic map and further utilize a clustering model to group together two or more genes. In particular, the causal discovery system 100 can utilize machine learning classification model trained for a specific cluster of genes to generate clinical outcome predictions and further utilize an explainability model to generate contribution values for clinical features that resulted in the clinical outcome predictions. Further, the causal discovery system 100 utilizes the contribution values to further filter down genes in a cluster of genes to generate gene targets. The causal discovery system 100 can then utilizes the causal discovery model to process the gene targets and determine one or more causal predictions between a gene and the clinical outcome based on the clinical observation data.

As used herein, the term "machine learning model" includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques (e.g., supervised or unsupervised learning) to improve in accuracy and/or effectiveness. Example machine learning models include various types of decision trees, support vector machines, Bayesian networks, random forest models, or neural networks (e.g., deep neural networks, generative adversarial neural networks, convolutional neural networks, recurrent neural networks, or diffusion neural networks). Similarly, the term "machine learning data" refers to information, data, or files generated or utilized by a machine learning model. Machine learning data can include training data, machine learning parameters, or embeddings/predictions generated by a machine learning model.

As also illustrated in FIG. 11, the environment includes the client device(s) 1110. For example, the client device(s) 1110 may include, but is not limited to, a mobile device (e.g., smartphone, tablet) or other type of computing device, including those explained below with reference to FIG. 13. Additionally, the client device(s) 1110 can include a computing device associated with (and/or operated by) user accounts for the tech-bio exploration system 1104. Moreover, the environment can include various numbers of client devices that communicate and/or interact with the tech-bio exploration system 1104 and/or the causal discovery system 100.

Furthermore, in one or more implementations, the client device(s) 1110 includes a client application. The client application can include instructions that (upon execution) cause the client device(s) 1110 to perform various actions. For example, a user of a user account can interact with the client application on the client device(s) 1110 to access tech-bio information, generate causal predictions, generate rating metrics, generate program ratings, initiate a request for a machine learning data set, initiate training of a machine learning model utilizing a machine learning data set, and/or generate GUIs comprising a machine learning data set, machine learning predictions/results, and/or machine learning efficacy.

As further shown in FIG. 11, the environment includes the network 1108. As mentioned above, the network 1108 can enable communication between components of the environment. In one or more embodiments, the network 1108 may include a suitable network and may communicate using a various number of communication platforms and technologies suitable for transmitting data and/or communication signals, examples of which are described with reference to FIG. 13. Furthermore, although FIG. 11 illustrates computing devices communicating via the network 1108, the various components of the environment can communicate and/or interact via other methods (e.g., communicate directly).

As mentioned previously, in one or more implementations, the causal discovery system 100 generates and accesses machine learning objects, such as results from biological assays. As shown, in FIG. 11, the causal discovery system 100 can communicate with testing device(s) 1116 to obtain and then store this information. For example, the tech-bio exploration system 1104 can interact with the testing device(s) 1116 that include intelligent robotic devices and camera devices for generating and capturing digital images of cellular phenotypes resulting from different perturbations (e.g., genetic knockouts or compound treatments of stem cells) and sequencing machines. Similarly, the testing device(s) can include camera devices and/or other sensors (e.g., heat or motion sensors) capturing real-time information from animals as part of in vivo experimentation. The tech-bio exploration system 1104 can also interact with a variety of other testing device(s) such as devices for determining, generating, or extracting gene sequences or protein information.

As shown in FIG. 11, the environment also includes a variety of computing devices (i.e., digital repository platforms) capable of storing machine learning data objects. For instance, the causal discovery system 100 can store gene perturbation embeddings, clinical outcome predictions, contribution values, and causal predictions on digital repository platforms for later analysis to determine whether to initiate one or more compound exploration programs (e.g., ICG or IPG). As used herein, the term digital repository platform includes a storage device or set of storage devices (e.g., for storing digital files corresponding to machine learning data sets). In particular, a digital repository platform can include a set of storage devices at a particular location or controlled by a particular entity. Thus, for example, a digital repository platform can include a cloud service (e.g., Amazon Web Services), a local server, or a third-party server.

For example, with regard to the server(s) 1102, local servers operating the tech-bio exploration system 1104 can store machine learning data objects on various servers distributed geographically across different parts of the country or world. In addition, the cloud service(s) 1112a-1112b can also store machine learning data objects. For example, the causal discovery system 100 can utilize a cloud storage service provider and transmit machine learning data objects to the cloud service(s) 1112a-1112b. Further, the causal discovery system 100 can interact with third-party server(s) 1114 (e.g., servers operated and owned by separate entities, such as a coordinating partner with its own biological data). The causal discovery system 100 can collaborate with third parties to generate machine learning data sets from machine learning data objects retained on the third-party server(s) 1114. In addition, the causal discovery system 100 can also interact with dedicated machine learning device(s) 1120. For example, the dedicated machine learning device(s) 1120 can include computing devices or virtual machines dedicated to training or implementing large-scale machine learning models. In some implementations, the causal discovery system 100 can also store machine learning data objects on the dedicated machine learning device(s) 1120. For instance, the dedicated machine learning device(s) 1120 can include a first classification model for a first cluster of genes and a second classification model for a second cluster of genes, each trained separately on data specific to the first cluster of genes and the second cluster of genes, respectively.

As shown in FIG. 11, the environment also includes administrator device(s) 1118. For example, the causal discovery system 100 can utilize the administrator device(s) 1118 to control various functions or operations in scheduling or implementing assays, training or implementing machine learning models, receiving and responding to requests, and/or managing a compound/drug discovery pipeline. To illustrate, the administrator device(s) 1118 can identify assays, set up machine learning processes, determine a framework or pipeline for analyzing machine learning models, selecting storage locations in particular digital repository platforms for digital files, and/or determine access permissions to particular digital information or for initiating certain downstream programs (e.g., IPG and ICG).

FIGS. 1-11, the corresponding text, and the examples provide a number of different systems, methods, and non-transitory computer readable media for generating a causal prediction between a gene and a clinical outcome utilizing gene targets and a clinical observation data set. In addition to the foregoing, embodiments can also be described in terms of flowcharts comprising acts for accomplishing a particular result. For example, FIG. 12 illustrates a flowchart of an example sequence of acts in accordance with one or more embodiments.

Figure 12:
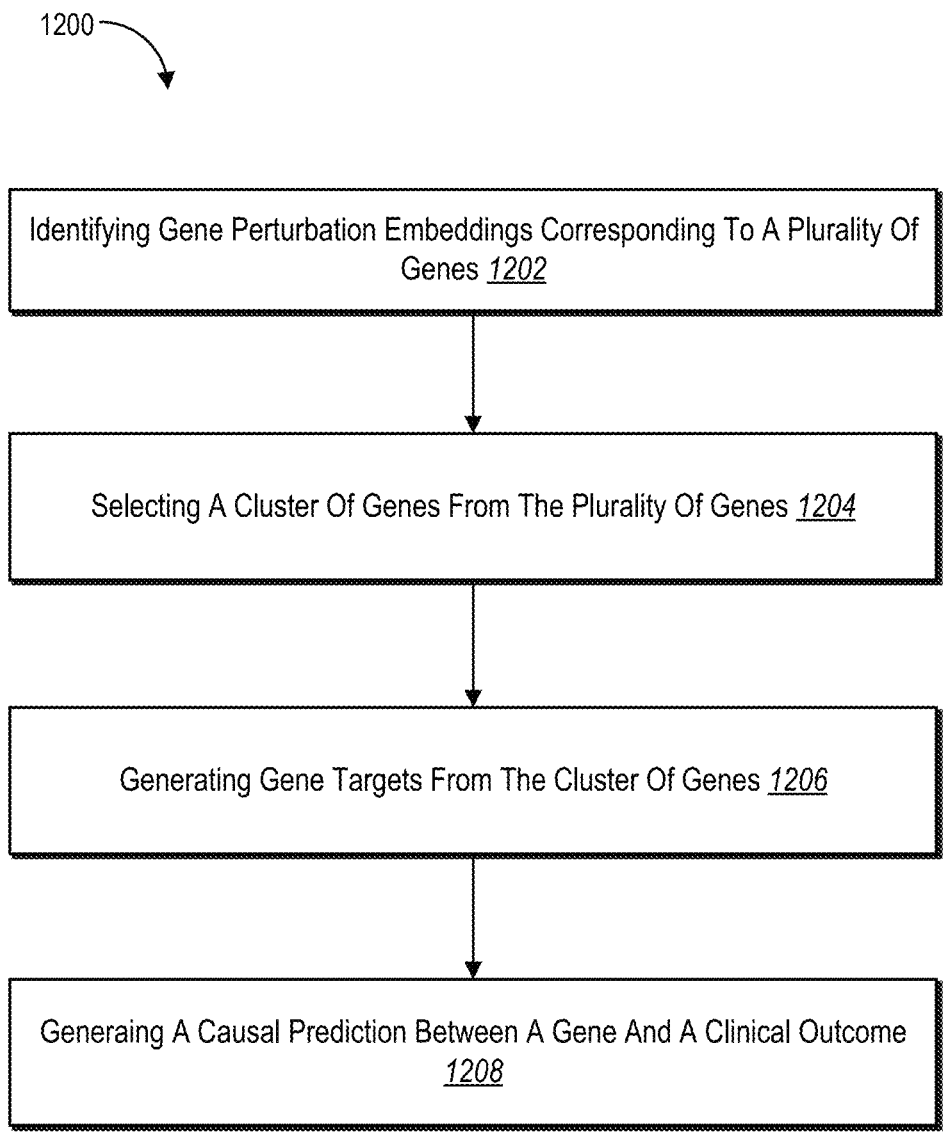
FIG. 12 illustrates an example series of acts to generate a causal prediction between a gene and a clinical outcome in accordance with one or more embodiments.

While FIG. 12 illustrates acts according to some embodiments, alternative embodiments may omit, add to, reorder, and/or modify any of the acts shown in FIG. 12. The acts of FIG. 12 can be performed as part of a method (e.g., a computer-implemented method). Alternatively, a non-transitory computer readable medium can comprise instructions, that when executed by one or more processors (e.g., at least one processor), cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example series of acts 1200 for generating a causal prediction between a gene and a clinical outcome utilizing gene targets and a clinical observation data set in accordance with one or more embodiments. The series of acts 1200 can include an act 1202 of identifying gene perturbation embeddings corresponding to a plurality of genes, an act 1204 of selecting a cluster of genes from the plurality of genes, an act 1206 of generating gene targets from the cluster of genes, and an act 1208 of generating a causal prediction between a gene and a clinical outcome. Specifically, the series of acts 1200 can include acts 1202-1208 of identifying gene perturbation embeddings generated from cells exposed to perturbations corresponding to a plurality of genes; selecting a cluster of genes from the plurality of genes by applying a clustering model to the gene perturbation embeddings; generating, utilizing a machine learning classification model trained utilizing a plurality of features of a clinical observation data set, gene targets from the cluster of genes; and generating, utilizing a causal discovery model, a causal prediction between one or more genes and a clinical outcome utilizing the gene targets and features of the clinical observation data set.

For example, in one or more embodiments, the series of acts 1200 includes capturing a phenomic image of a cell exposed to a gene knockout perturbation of a gene; and generating, utilizing a machine learning model, a gene perturbation embedding for the gene from the phenomic image. In one or more implementations, the series of acts 1200 includes generating utilizing the clustering model, a plurality of clusters from at least one of: the gene perturbation embeddings or similarity metrics between the gene perturbation embeddings.

In addition, in one or more implementations, the series of acts 1200 includes training the machine learning classification model by generating, utilizing the machine learning classification model, clinical outcome predictions for the cluster of genes from features of the plurality of features from the clinical observation data set; comparing the clinical outcome predictions with observed clinical outcomes from the clinical observation data set to determine a measure of loss; and modifying parameters of the machine learning classification model based on the measure of loss.

Further, in some implementations, the series of acts 1200 includes generating, utilizing the machine learning classification model, a plurality of clinical outcome predictions from clinical features of the clinical observation data set corresponding to the cluster of genes; generating, utilizing an explainability model, contribution values for genes of the cluster of genes from the plurality of clinical outcome predictions of the machine learning classification model; and generating the gene targets from the cluster of genes utilizing the contribution values.

In one or more implementations, the series of acts 1200 includes selecting an additional cluster of genes from the plurality of clusters. Moreover, in one or more implementations, the series of acts 1200 includes generating, utilizing an additional machine learning classification model corresponding to the additional cluster of genes, additional gene targets from the additional cluster of genes.

In addition, in some implementations, the series of acts 1200 includes training the additional machine learning classification model corresponding to the additional cluster of genes utilizing additional clinical outcome predictions for the additional cluster of genes from the clinical observation data set. In one or more implementations, the series of acts 1200 includes generating an additional causal prediction between an additional gene and an additional clinical outcome utilizing the additional gene targets and the clinical observation data set.

In one or more implementations, the series of acts 1200 includes generating the causal prediction by building a causal graph comprising the gene targets and the clinical outcome; and generating the causal prediction by measuring sensitivity to modifying variables of the causal graph. Further, in one or more implementations, the series of acts 1200 includes generating, utilizing a large language model, a rating metric corresponding to the gene; and combining the rating metric and the causal prediction to generate a program initiation metric.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
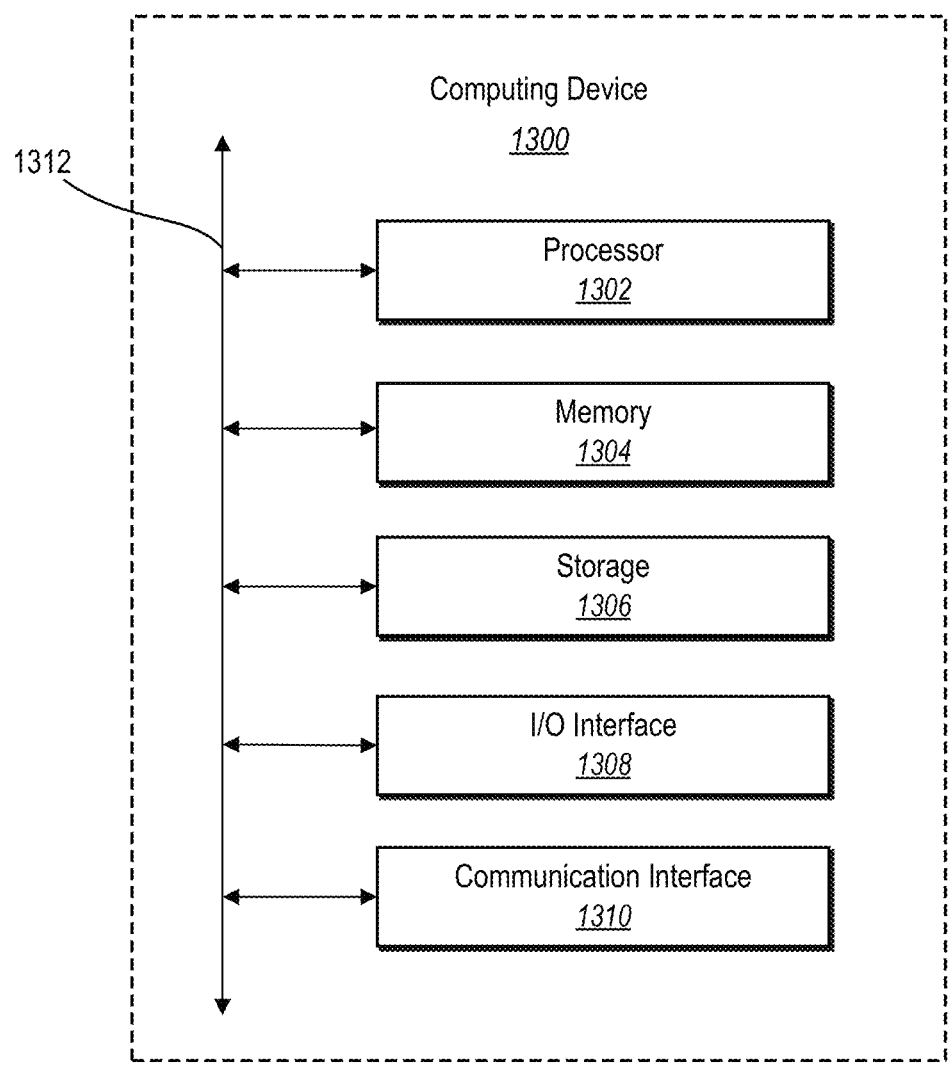
FIG. 13 illustrates a block diagram of a computing device for implementing one or more embodiments.

FIG. 13 illustrates a block diagram of an example computing device 1300 that may be configured to perform one or more of the processes described above. One will appreciate that one or more computing devices, such as the computing device 1300 may represent the computing devices described above. In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In one or more implementations, various computing devices can communicate over a computer network. This disclosure contemplates any suitable network. As an example, and not by way of limitation, one or more portions of a network may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these.

In particular embodiments, the computing device 1300 can include a client device that includes a requester application or a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at the client device may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device one or more Hyper Text Markup Language ("HTML") files responsive to the HTTP request. The client device may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the tech-bio exploration system 1104 may include a variety of servers, sub-systems, programs, modules, logs, and data stores. In particular embodiments, the tech-bio exploration system 1104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The tech-bio exploration system 1104 may also include suitable components such as network interfaces, security mechanisms, load balancers, failover servers, management-and-network-operations consoles, other suitable components, or any suitable combination thereof. In particular embodiments, the tech-bio exploration system 1104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the tech-bio exploration system 1104 and one or more client devices. An action logger may be used to receive communications from a web server about a user's actions on or off the tech-bio exploration system 1104. In conjunction with the action log, a third-party-content-object log may be maintained of user exposures to third-party-content objects. A notification controller may provide information regarding content objects to a client device. Information may be pushed to a client device as notifications, or information may be pulled from a client device responsive to a request received from the client device. Authorization servers may be used to enforce one or more privacy settings of the users of the tech-bio exploration system 1104. A privacy setting of a user determines how particular information associated with a user can be shared. The authorization server may allow users to opt in to or opt out of having their actions logged by the tech-bio exploration system 1104 or shared with other systems, such as, for example, by setting appropriate privacy settings. Third-party-content-object stores may be used to store content objects received from third parties. Location stores may be used for storing location information received from a client device associated with users.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    capturing, utilizing one or more digital cameras, a plurality of phenomic images of cells exposed to perturbation treatments corresponding to a plurality of genes;
    generating, utilizing a trained phenomic image machine learning model, gene perturbation embeddings from the plurality of phenomic images of the cells;
    generating gene clusters by applying a clustering model to the gene perturbation embeddings of the plurality of genes within a machine learning feature space to generate a plurality of clusters of genes;
    for a cluster of genes from the plurality of clusters of the genes generated from the gene perturbation embeddings, training a machine learning classification model corresponding to the cluster of genes by:
        generating clinical outcome predictions from a plurality of features corresponding to the cluster of genes;
        generating a measure of loss by comparing, utilizing a loss function, the clinical outcome predictions with observed clinical outcomes; and
        generating modified parameters from initial parameters of the machine learning classification model to reduce the measure of loss corresponding to the clinical outcome predictions and improve accuracy of the machine learning classification model in generating clinical outcome predictions;
    generating clinical outcome predictions utilizing the machine learning classification model;
    generating, utilizing an explainability model, contribution values for the clinical outcome predictions generated from using the trained machine learning classification model, wherein a contribution value indicates an importance of a gene from the cluster of genes to a clinical outcome relative to other genes in the cluster of genes;
    generating filtered gene targets by removing one or more reduced impact genes from the cluster of genes by applying a significance threshold to the contribution values generated from the explainability model, wherein the filtered gene targets indicate elevated impact candidate genes of the cluster of genes corresponding to the clinical outcome;
    generating, utilizing a causal discovery model, a causal prediction between one or more genes of the filtered gene targets and the clinical outcome by utilizing the filtered gene targets and features of a clinical observation data set;
    generating one or more gene perturbation embeddings of the one or more genes of the filtered gene targets; and
    further training the machine learning classification model utilizing the one or more gene perturbation embeddings.

2. The method of claim 1, further comprising:
    performing an assay to perturb the one or more genes of the filtered gene targets in a cell;
    capturing, utilizing the one or more digital cameras, a phenomic image of the cell that includes the perturbed one or more genes of the filtered gene targets; and
    generating the one or more gene perturbation embeddings of the one or more genes of the filtered gene targets from the phenomic image.

3. The method of claim 1, wherein applying the clustering model to the gene perturbation embeddings comprises generating utilizing the clustering model, the plurality of clusters from at least one of: the gene perturbation embeddings or similarity metrics between the gene perturbation embeddings.

4. The method of claim 1, wherein training the machine learning classification model corresponding to the cluster of genes further comprises:
    generating, utilizing the machine learning classification model comprising the modified parameters, an additional set of clinical outcome predictions;
    generating an additional measure of loss by comparing, utilizing the loss function, the additional set of clinical outcome predictions with the observed clinical outcomes;
    generating additional modified parameters from the modified parameters of the machine learning classification model to improve accuracy of the machine learning classification model in generating clinical outcome predictions; and
    removing the modified parameters from the machine learning classification model to replace with the additional modified parameters.

5. The method of claim 1, wherein generating the contribution values for the clinical outcome predictions comprises:
    generating a marginal contribution of each feature of the plurality of features corresponding to the cluster of genes by perturbing the plurality of features to generate the clinical outcome predictions;

determining a difference in the clinical outcome predictions by measuring variations in the clinical outcome predictions relative to perturbations to the plurality of features; and generating the contribution values based on the difference in the clinical outcome predictions.

6. The method of claim 3, further comprising:
selecting an additional cluster of genes from the plurality of clusters; and
generating, utilizing an additional machine learning classification model corresponding to the additional cluster of genes, additional gene targets from the additional cluster of genes.

7. The method of claim 6, further comprising training the additional machine learning classification model corresponding to the additional cluster of genes utilizing additional clinical outcome predictions for the additional cluster of genes from the clinical observation data set.

8. The method of claim 6, further comprising generating an additional causal prediction between an additional gene and an additional clinical outcome utilizing the additional gene targets and the clinical observation data set.

9. The method of claim 1, further comprising generating the causal prediction by:
building a causal graph comprising the filtered gene targets and the clinical outcome; and
generating the causal prediction by measuring sensitivity to modifying variables of the causal graph.

10. The method of claim 1, further comprising:
generating, utilizing a large language model, a rating metric corresponding to the one or more genes from the causal prediction;
combining the rating metric and the causal prediction to generate a program initiation metric; and
based on the rating metric and the causal prediction, determining to initiate a compound exploration program to develop a drug compound for one or more genes from the causal prediction.

11. A method comprising:
capturing, utilizing one or more digital cameras, a plurality of phenomic images of cells exposed to perturbation treatments corresponding to a plurality of genes;
generating, utilizing a trained phenomic image machine learning model, gene perturbation embeddings from phenomic images of the cells;
generating gene clusters by applying a clustering model to the gene perturbation embeddings of the plurality of genes within a machine learning feature space to generate a plurality of clusters of genes;
for a first cluster of genes from the plurality of clusters of the genes generated from the gene perturbation embeddings training a first machine learning classification model corresponding to the first cluster of genes by:
generating clinical outcome predictions from a plurality of features corresponding to the first cluster of genes;
generating a measure of loss by comparing, utilizing a loss function, the clinical outcome predictions with observed clinical outcomes; and
generating modified parameters from inaccurate initial parameters of the first machine learning classification model to reduce the measure of loss corresponding to the inaccurate clinical outcome predictions and improve accuracy of the first machine learning classification model in generating clinical outcome predictions;

generating clinical outcome predictions utilizing the first machine learning classification model;

generate, utilizing an explainability model, contribution values for the clinical outcome predictions generated from using the trained machine learning classification model, wherein a contribution value indicates an importance of a gene from the first cluster of genes to a clinical outcome relative to other genes in the first cluster of genes;

generating filtered gene targets by removing one or more reduced impact genes from the first cluster of genes by applying a significance threshold to the contribution values generated from the explainability model, wherein the filtered gene targets indicate elevated impact candidate genes of the first cluster of genes corresponding to the clinical outcome;

generate, utilizing a causal discovery model, a causal prediction between one or more genes of the filtered gene targets and the clinical outcome by utilizing the filtered gene targets and features of a clinical observation data set;

for a second cluster of genes from the plurality of clusters of the genes generated from the gene perturbation embeddings, training a second machine learning classification model corresponding to the second cluster of genes;

generating additional clinical outcome predictions utilizing the second machine learning classification model;

generating, utilizing the explainability model, additional contribution values for the additional clinical outcome predictions generated from using the second machine learning classification model;

generating additional filtered gene targets utilizing the additional contribution values; and generating, utilizing the causal discovery model, an additional causal prediction between at least one gene of the additional filtered gene targets and the clinical outcome by utilizing the additional filtered gene targets and features of the clinical observation data set.

12. The method of claim 11, wherein identifying the gene perturbation embeddings comprises:
performing an assay to perturb the one or more genes of the filtered gene targets in a cell; and
performing an additional assay to perturb the at least one gene of the additional filtered gene targets in an additional cell.

13. The method of claim 12, further comprising:
capturing, utilizing the one or more digital cameras, a phenomic image of the cell that includes the perturbed one or more genes of the filtered gene targets; and
capturing, utilizing the one or more digital cameras, an additional phenomic image of the additional cell that includes the at least one perturbed gene of the additional filtered gene targets.

14. The method of claim 13, further comprising:
generating one or more gene perturbation embeddings of the one or more genes of the filtered gene targets from the phenomic image;
generating at least one gene perturbation embedding of the additional filtered gene targets from the additional phenomic image;

further training the first machine learning classification model utilizing the one or more gene perturbation embeddings of the one or more genes of the filtered gene targets; and further training the second machine learning classification model utilizing the at least one gene perturbation embedding of the additional filtered gene targets.

15. The method of claim 11, further comprising:

based on the causal prediction, determine to initiate a compound exploration program to develop a drug compound for one or more genes from the causal prediction.

16. The method of claim 11, further comprising:

building a causal graph comprising a plurality of nodes representing the plurality of features and the filtered gene targets, and edges representing potential causal relationships; and generating the causal prediction by measuring sensitivity to modifying one or more of the edges connecting one or more of the plurality of nodes in the causal graph.

17. A method comprising:

capturing, utilizing one or more digital cameras, a plurality of phenomic images of cells exposed to perturbation treatments corresponding to a plurality of genes;

generating, utilizing a trained phenomic image machine learning model, gene perturbation embeddings from the plurality of phenomic images of the cells;

generating gene clusters by applying a clustering model to the gene perturbation embeddings of the plurality of genes within a machine learning feature space to generate a plurality of clusters of genes;

for a cluster of genes from the plurality of clusters of the genes generated from the gene perturbation embeddings training a machine learning classification model corresponding to the cluster of genes by:

generating clinical outcome predictions from a plurality of features corresponding to the cluster of genes;

generating a measure of loss by comparing, utilizing a loss function, the clinical outcome predictions with observed clinical outcomes; and generating modified parameters from initial parameters of the machine learning classification model to reduce the measure of loss corresponding to the clinical outcome predictions and improve accuracy of the machine learning classification model in generating clinical outcome predictions;

generating clinical outcome predictions utilizing the machine learning classification model;

generating, utilizing an explainability model, contribution values for the clinical outcome predictions generated from using the trained machine learning classification model, wherein a contribution value indicates an importance of a gene from the cluster of genes to a clinical outcome relative to other genes in the cluster of genes;

generating filtered gene targets by removing one or more reduced impact genes from the cluster of genes by applying a significance threshold to the contribution values generated from the explainability model, the filtered gene targets indicate elevated impact candidate genes of the cluster of genes corresponding to the clinical outcome;

generate, utilizing a causal discovery model, a causal prediction between one or more genes of the filtered gene targets and the clinical outcome by utilizing the filtered gene targets and features of a clinical observation data set; and performing an assay to perturb the one or more genes of the filtered gene targets in a cell.

18. The method of claim 17, further comprising:

capturing, utilizing the one or more digital cameras, a phenomic image of the cell from the assay that includes the perturbed one or more genes of the filtered gene targets; and generating one or more gene perturbation embeddings of the one or more genes of the filtered gene targets from the phenomic image.

19. The method of claim 18, further comprising further training the machine learning classification model utilizing the one or more gene perturbation embeddings.

20. The method of claim 17, wherein performing the assay to perturb the one or more genes of the filtered gene targets comprises:

in response to generating the causal prediction, causing a testing device comprising intelligent robotic devices and camera devices to capture a phenomic image of the cell from the assay that includes the perturbed one or more genes of the filtered gene targets.

* * * * *